US011798302B2

(12) United States Patent
Kotovich et al.

(10) Patent No.: US 11,798,302 B2
(45) Date of Patent: *Oct. 24, 2023

(54) MOBILE IMAGE QUALITY ASSURANCE IN MOBILE DOCUMENT IMAGE PROCESSING APPLICATIONS

(71) Applicant: MITEK SYSTEMS, INC., San Diego, CA (US)

(72) Inventors: Nikolay Kotovich, San Diego, CA (US); Grigori Nepomniachtchi, San Diego, CA (US); James Debello, San Diego, CA (US)

(73) Assignee: MITEK SYSTEMS, INC., San Diego, CA (US)

( * ) Notice: Subject to any disclaimer, the term of this patent is extended or adjusted under 35 U.S.C. 154(b) by 443 days.

This patent is subject to a terminal disclaimer.

(21) Appl. No.: 16/987,782

(22) Filed: Aug. 7, 2020

(65) Prior Publication Data

US 2020/0364480 A1    Nov. 19, 2020

Related U.S. Application Data

(63) Continuation of application No. 16/397,728, filed on Apr. 29, 2019, now Pat. No. 10,789,496, which is a (Continued)

(51) Int. Cl.
*G06V 30/40* (2022.01)
*G06V 10/98* (2022.01)
*G06V 10/24* (2022.01)

(52) U.S. Cl.
CPC .............. *G06V 30/40* (2022.01); *G06V 10/24* (2022.01); *G06V 10/993* (2022.01)

(58) Field of Classification Search
CPC ....... G06Q 20/00–38; G06V 30/40–43; G06V 10/993; G06T 7/0002

See application file for complete search history.

(56) References Cited

U.S. PATENT DOCUMENTS 5,600,732 A * 2/1997 Ott ........................... G07D 7/00
                                                                382/318
5,751,841 A * 5/1998 Leong ....................... G07D 7/06
                                                                382/137
(Continued)

FOREIGN PATENT DOCUMENTS

KR    20040076131 A    8/2004
KR    20070115834 A    12/2007
(Continued)

OTHER PUBLICATIONS

International Search Report issued in related International Application No. PCT/US2011/056593 dated May 30, 2012 (3 pages).

(Continued)

*Primary Examiner* — Sean T Motsinger
(74) *Attorney, Agent, or Firm* — PROCOPIO, CORY, HARGREAVES & SAVITCH LLP

(57) ABSTRACT

Techniques for assuring the quality of mobile document image captured using a mobile device are provided. These techniques include performing one or more tests to assess the quality of images of documents captured using the mobile device. The tests can be selected based on the type of document that was imaged, the type of mobile application for which the image quality of the mobile image is being assessed, and/or other parameters such as the type of mobile device and/or the characteristics of the camera of the mobile device that was used to capture the image. The image quality assurance techniques can also be implemented on can be implemented on a mobile device and/or on a remote server where the mobile device routes the mobile image to the remote server processing and the test results are be passed from the remote server to the mobile device.

19 Claims, 30 Drawing Sheets

Related U.S. Application Data continuation of application No. 15/620,103, filed on Jun. 12, 2017, now Pat. No. 10,275,673, which is a continuation of application No. 14/961,767, filed on Dec. 7, 2015, now Pat. No. 9,679,214, which is a continuation of application No. 14/078,521, filed on Nov. 12, 2013, now Pat. No. 9,208,393, which is a continuation-in-part of application No. 12/778,943, filed on May 12, 2010, now Pat. No. 8,582,862.

(56) References Cited

U.S. PATENT DOCUMENTS

| | | | |
|---|---|---|---|
| 5,761,686 A | 6/1998 | Bloomberg | |
| 5,966,473 A | 10/1999 | Takahashi et al. | |
| 6,038,351 A | 3/2000 | Rigakos | |
| 6,038,553 A | 3/2000 | Hyde, Jr. | |
| 6,345,130 B1* | 2/2002 | Dahl | H04N 1/00013 382/286 |
| 6,408,094 B1 | 6/2002 | Mirzaoff et al. | |
| 6,621,919 B2* | 9/2003 | Mennie | G07D 7/162 382/135 |
| 6,735,341 B1 | 5/2004 | Horie et al. | |
| 6,807,294 B2 | 10/2004 | Yamazaki | |
| 6,947,610 B2 | 9/2005 | Sun | |
| 6,985,631 B2 | 1/2006 | Zhang | |
| 6,993,205 B1 | 1/2006 | Lorie et al. | |
| 7,020,320 B2 | 3/2006 | Filatov | |
| 7,245,765 B2 | 7/2007 | Myers et al. | |
| 7,283,656 B2* | 10/2007 | Blake | G06V 10/993 382/137 |
| 7,331,523 B2 | 2/2008 | Meier et al. | |
| 7,376,258 B2* | 5/2008 | Klein | G06Q 20/042 382/140 |
| 7,377,425 B1 | 5/2008 | Ma et al. | |
| 7,426,316 B2* | 9/2008 | Vehvilainen | H04N 1/00209 348/14.02 |
| 7,433,098 B2* | 10/2008 | Klein | G07F 19/202 382/209 |
| 7,548,641 B2* | 6/2009 | Gilson | G06Q 20/04 382/137 |
| 7,558,418 B2* | 7/2009 | Verma | G06V 10/993 382/137 |
| 7,593,595 B2 | 9/2009 | Heaney, Jr. et al. | |
| 7,606,741 B2 | 10/2009 | King et al. | |
| 7,735,721 B1* | 6/2010 | Ma | G07D 7/04 382/137 |
| 7,793,835 B1 | 9/2010 | Coggeshall et al. | |
| 7,869,098 B2* | 1/2011 | Corso | H04N 1/32122 358/405 |
| 7,873,200 B1 | 1/2011 | Oakes, III et al. | |
| 7,876,949 B1 | 1/2011 | Oakes, III et al. | |
| 7,949,176 B2 | 5/2011 | Nepomniachtchi | |
| 7,950,698 B2* | 5/2011 | Popadic | G06Q 20/24 382/137 |
| 7,953,268 B2 | 5/2011 | Nepomniachtchi | |
| 7,982,770 B1 | 5/2011 | Kahn et al. | |
| 7,974,899 B1* | 7/2011 | Prasad | G06Q 40/00 705/37 |
| 7,978,900 B2 | 7/2011 | Nepomniachtchi et al. | |
| 7,983,468 B2 | 7/2011 | Ibikunle et al. | |
| 7,986,346 B2 | 7/2011 | Kaneda et al. | |
| 7,995,196 B1 | 8/2011 | Fraser | |
| 7,996,317 B1 | 8/2011 | Gurz | |
| 8,000,514 B2 | 8/2011 | Nepomniachtchi et al. | |
| 8,023,155 B2* | 9/2011 | Jiang | G06Q 10/10 358/3.22 |
| 8,118,216 B2 | 2/2012 | Hoch et al. | |
| 8,126,252 B2* | 2/2012 | Abernethy | G06V 10/987 382/139 |
| 8,180,137 B2 | 5/2012 | Faulkner et al. | |
| 8,238,638 B2* | 8/2012 | Mueller | G06V 10/993 382/137 |
| 8,290,237 B1* | 10/2012 | Burks | G06Q 20/3276 382/137 |
| 8,300,917 B2* | 10/2012 | Borgia | G06Q 40/12 705/30 |
| 8,320,657 B1 | 11/2012 | Burks et al. | |
| 8,339,642 B2 | 12/2012 | Ono | |
| 8,358,826 B1 | 1/2013 | Medina, III et al. | |
| 8,379,914 B2* | 2/2013 | Nepomniachtchi | G06Q 20/042 382/102 |
| 8,532,419 B2 | 9/2013 | Coleman | |
| 8,538,124 B1 | 9/2013 | Harpel et al. | |
| 8,542,921 B1* | 9/2013 | Medina | G06Q 40/02 382/172 |
| 8,559,766 B2 | 10/2013 | Tilt et al. | |
| 8,582,862 B2* | 11/2013 | Nepomniachtchi | G06V 10/24 138/140 |
| 8,699,779 B1* | 4/2014 | Prasad | H04N 23/63 382/137 |
| 8,959,033 B1* | 2/2015 | Oakes, III | G06V 40/172 382/137 |
| 8,977,571 B1* | 3/2015 | Bueche, Jr. | G06Q 20/042 705/45 |
| 9,058,512 B1 | 6/2015 | Medina, III | |
| 9,208,393 B2* | 12/2015 | Kotovich | G06V 10/993 |
| 9,679,214 B2* | 6/2017 | Kotovich | G06V 30/40 |
| 9,842,331 B2 | 12/2017 | Nepomniachtchi et al. | |
| 10,275,673 B2* | 4/2019 | Kotovich | G06V 10/993 |
| 10,789,496 B2* | 9/2020 | Kotovich | G06V 10/993 |
| 10,909,362 B2 | 2/2021 | Nepomniachtchi et al. | |
| 2001/0014183 A1 | 8/2001 | Sansom-Wai et al. | |
| 2001/0016084 A1 | 8/2001 | Pollard et al. | |
| 2001/0019664 A1 | 9/2001 | Pilu | |
| 2001/0044899 A1 | 11/2001 | Levy | |
| 2002/0003896 A1 | 1/2002 | Yamazaki | |
| 2002/0012462 A1 | 1/2002 | Fujiwara | |
| 2002/0041717 A1 | 4/2002 | Murata et al. | |
| 2002/0067846 A1 | 6/2002 | Foley | |
| 2003/0072568 A1 | 4/2003 | Lin et al. | |
| 2003/0086615 A1 | 5/2003 | Dance et al. | |
| 2003/0161523 A1 | 8/2003 | Moon et al. | |
| 2003/0177100 A1 | 9/2003 | Filatov | |
| 2004/0012679 A1 | 1/2004 | Fan | |
| 2004/0037448 A1 | 2/2004 | Brundage | |
| 2004/0109597 A1 | 6/2004 | Lugg | |
| 2004/0213434 A1* | 10/2004 | Emerson | G06V 30/2253 382/112 |
| 2004/0218799 A1* | 11/2004 | Mastie | G06V 30/413 382/137 |
| 2005/0011957 A1 | 1/2005 | Attia et al. | |
| 2005/0065893 A1 | 3/2005 | Josephson | |
| 2005/0080698 A1 | 4/2005 | Perg et al. | |
| 2005/0097046 A1 | 5/2005 | Singfield | |
| 2005/0100216 A1* | 5/2005 | Myers | G06V 30/142 358/473 |
| 2005/0143136 A1 | 6/2005 | Lev et al. | |
| 2005/0196071 A1 | 9/2005 | Prakash et al. | |
| 2005/0213805 A1* | 9/2005 | Blake | G06V 10/993 382/137 |
| 2005/0219367 A1 | 10/2005 | Kanda et al. | |
| 2005/0220324 A1* | 10/2005 | Klein | G07D 11/30 382/112 |
| 2005/0242186 A1 | 11/2005 | Ohbuchi | |
| 2005/0261990 A1 | 11/2005 | Gocht et al. | |
| 2006/0008167 A1 | 1/2006 | Yu et al. | |
| 2006/0008267 A1 | 1/2006 | Kim | |
| 2006/0012699 A1 | 1/2006 | Miki | |
| 2006/0045379 A1 | 3/2006 | Heaney et al. | |
| 2006/0071950 A1 | 4/2006 | Kurzweil et al. | |
| 2006/0072822 A1* | 4/2006 | Hatzav | G03B 15/00 382/181 |
| 2006/0140504 A1 | 6/2006 | Fujimoto et al. | |
| 2006/0164682 A1 | 7/2006 | Lev | |
| 2006/0177118 A1 | 8/2006 | Ibikunle et al. | |
| 2006/0182331 A1* | 8/2006 | Gilson | G06Q 20/04 382/137 |
| 2006/0186194 A1* | 8/2006 | Richardson | G06Q 20/042 235/379 |
| 2006/0210192 A1 | 9/2006 | Orhun | |

(56) References Cited

U.S. PATENT DOCUMENTS

| | | |
|---|---|---|
| 2006/0221415 A1 | 10/2006 | Kawamoto |
| 2006/0280354 A1* | 12/2006 | Murray .................. G06K 17/00 382/137 |
| 2006/0291727 A1 | 12/2006 | Bargeron |
| 2007/0053574 A1* | 3/2007 | Verma .................. G06V 10/993 382/137 |
| 2007/0058851 A1* | 3/2007 | Quine .................... G07D 11/32 382/137 |
| 2007/0076940 A1 | 4/2007 | Goodall et al. |
| 2007/0081796 A1 | 4/2007 | Fredlund et al. |
| 2007/0084911 A1 | 4/2007 | Crowell |
| 2007/0086642 A1 | 4/2007 | Foth et al. |
| 2007/0086643 A1 | 4/2007 | Spier et al. |
| 2007/0140678 A1 | 6/2007 | Yost et al. |
| 2007/0154071 A1 | 7/2007 | Lin et al. |
| 2007/0156438 A1* | 7/2007 | Popadic .................. G06Q 40/00 229/71 |
| 2007/0168382 A1 | 7/2007 | Tillberg et al. |
| 2007/0171288 A1 | 7/2007 | Inoue et al. |
| 2007/0195174 A1 | 8/2007 | Oren |
| 2007/0206877 A1* | 9/2007 | Wu ......................... G06T 5/006 382/275 |
| 2007/0211964 A1 | 9/2007 | Agam et al. |
| 2007/0288382 A1 | 12/2007 | Narayanan et al. |
| 2008/0031543 A1 | 2/2008 | Nakajima et al. |
| 2008/0040259 A1 | 2/2008 | Snow et al. |
| 2008/0062437 A1 | 3/2008 | Rizzo |
| 2008/0089573 A1* | 4/2008 | Mori ...................... G07D 7/164 382/135 |
| 2008/0174815 A1 | 7/2008 | Komaki |
| 2008/0183576 A1 | 7/2008 | Kim et al. |
| 2008/0192129 A1 | 8/2008 | Walker et al. |
| 2008/0212901 A1 | 9/2008 | Castiglia et al. |
| 2008/0231714 A1 | 9/2008 | Estevez et al. |
| 2008/0247629 A1* | 10/2008 | Gilder .................. G06Q 20/108 382/137 |
| 2008/0267510 A1* | 10/2008 | Paul ................. G07B 17/00467 382/209 |
| 2009/0063431 A1* | 3/2009 | Erol ...................... G06F 16/583 |
| 2009/0092322 A1 | 4/2009 | Erol et al. |
| 2009/0114716 A1* | 5/2009 | Ramachandran ....... G07F 19/20 235/379 |
| 2009/0125510 A1 | 5/2009 | Graham et al. |
| 2009/0141962 A1* | 6/2009 | Borgia .................. G06Q 20/04 705/30 |
| 2009/0159659 A1* | 6/2009 | Norris .................. G06Q 20/042 235/379 |
| 2009/0185241 A1 | 7/2009 | Nepomniachtchi |
| 2009/0185736 A1 | 7/2009 | Nepomniachtchi |
| 2009/0185737 A1* | 7/2009 | Nepomniachtchi ......................... H04N 1/00816 382/137 |
| 2009/0185738 A1 | 7/2009 | Nepomniachtchi |
| 2009/0261158 A1 | 10/2009 | Lawson |
| 2009/0265134 A1 | 10/2009 | Sambasivan et al. |
| 2009/0271287 A1* | 10/2009 | Halpern .................. G06Q 40/00 705/26.1 |
| 2010/0030524 A1 | 2/2010 | Warren |
| 2010/0073735 A1 | 3/2010 | Hunt et al. |
| 2010/0074547 A1* | 3/2010 | Yu ......................... H04N 17/002 382/255 |
| 2010/0080471 A1* | 4/2010 | Haas .................. H04N 1/32331 726/2 |
| 2010/0082470 A1* | 4/2010 | Walach .................. G06Q 40/02 455/466 |
| 2010/0102119 A1 | 4/2010 | Gustin et al. |
| 2010/0104171 A1 | 4/2010 | Faulkner et al. |
| 2010/0114765 A1 | 5/2010 | Gustin et al. |
| 2010/0114766 A1 | 5/2010 | Gustin et al. |
| 2010/0114771 A1 | 5/2010 | Gustin et al. |
| 2010/0114772 A1 | 5/2010 | Gustin et al. |
| 2010/0200660 A1 | 8/2010 | Moed et al. |
| 2010/0208282 A1 | 8/2010 | Isaev |
| 2011/0013822 A1 | 1/2011 | Meek et al. |
| 2011/0081051 A1* | 4/2011 | Tayal .................. H04N 1/00002 382/112 |
| 2011/0091092 A1 | 4/2011 | Nepomniachtchi et al. |
| 2011/0134248 A1* | 6/2011 | Heit .................. H04N 1/00286 348/161 |
| 2011/0280450 A1* | 11/2011 | Nepomniachtchi .... G06V 10/24 382/112 |
| 2012/0030104 A1 | 2/2012 | Huff et al. |
| 2012/0070062 A1 | 3/2012 | Houle et al. |
| 2012/0230577 A1 | 9/2012 | Calman et al. |
| 2014/0040141 A1 | 2/2014 | Gauvin et al. |
| 2018/0101751 A1 | 4/2018 | Ghosh et al. |

FOREIGN PATENT DOCUMENTS

| | | |
|---|---|---|
| WO | 2006075967 A1 | 7/2006 |
| WO | 2006136958 A2 | 12/2006 |
| WO | 2012144957 A1 | 10/2012 |

OTHER PUBLICATIONS

Office Action dated Jan. 9, 2020 for related U.S. Appl. No. 16/397,728 in 56 pages.

Office Action dated Jul. 11, 2019 for related U.S. Appl. No. 15/614,456 in 45 pages.

Office Action dated Jul. 26, 2019 for related U.S. Appl. No. 16/282,250 in 21 pages.

Office Action dated Mar. 20, 2020 in related U.S. Appl. No. 16/282,250, in 20 pages.

Office Action dated May 27, 2020 for related U.S. Appl. No. 16/282,250 in 18 pages.

Notice of Allowance for related U.S. Appl. No. 16/742,439, dated Sep. 18, 2020, in 39 pages.

* cited by examiner

Document Processing

Check Processing

This figure is intentionally blurry.

This figure is intentionally blurry.

This figure is intentionally blurry.

Test Document Contrast

This figure is intentionally blurry.

Test Document Skew

Cut-Off Corner Test

Cut-Off Corner Test

This figure is intentionally blurry.

Warped Image Test

Image Size Test

MICR-line Test

Aspect Ratio Test

Front-as-Rear Test**

This figure is intentionally blurry.

This figure is intentionally blurry.

This figure is intentionally blurry.

MOBILE IMAGE QUALITY ASSURANCE IN MOBILE DOCUMENT IMAGE PROCESSING APPLICATIONS

CROSS-REFERENCE TO RELATED APPLICATIONS

This application is a continuation of U.S. patent application Ser. No. 16/397,728, filed on Apr. 29, 2019, which is a continuation of U.S. patent application Ser. No. 15/620,103, filed on Jun. 12, 2017, which is a continuation of U.S. patent application Ser. No. 14/961,767, filed on Dec. 7, 2015, which is a continuation of U.S. patent application Ser. No. 14/078,521, filed on Nov. 12, 2013, which is a continuation in part of U.S. patent application Ser. No. 12/778,943, filed on May 12, 2010, which are all hereby incorporated herein by reference in their entireties.

The present application is related to U.S. patent application Ser. No. 12/346,071, titled "METHODS FOR MOBILE IMAGE CAPTURE AND PROCESSING OF DOCUMENTS" filed on Dec. 30, 2008, U.S. patent application Ser. No. 12/346,091, titled "SYSTEMS FOR MOBILE IMAGE CAPTURE AND PROCESSING OF DOCUMENTS" filed on Dec. 30, 2008, and U.S. patent application Ser. No. 12/717,080, titled "SYSTEMS FOR MOBILE IMAGE CAPTURE AND PROCESSING OF CHECKS" filed on Mar. 3, 2010 which are hereby incorporated by reference in their entirety.

BACKGROUND

1. Technical Field

The embodiments described herein relate to processing images of documents captured using a mobile device, and more particularly to techniques for assuring the quality of document images captured by a mobile device to be used in processing the document.

2. Related Art

Banks and other businesses have become increasingly interested in electronic processing of check and other documents in order to expedite processing of these documents. Users can scan a copy of the document using a scanner or copier to create an electronic copy of the document that can be processed instead of routing a hardcopy of the document from one place to another for processing. For example, some banks can process digital images of checks and extract check information from the image needed to process the check without requiring that the physical check by routed throughout the bank for processing.

Mobile phones that incorporate cameras have also become ubiquitous. However, the quality of images captured varies greatly, and many factors can cause images captured using a mobile phone to be of poor quality. Therefore, images captured by mobile phones are often not of sufficiently high quality to be used for electronic processing of documents.

SUMMARY

Systems and methods for assuring the quality of mobile document image captured using a mobile device, such as a mobile phone, are provided. These techniques can be implemented on a mobile device and can be used to perform various tests to assess the quality of images of documents captured using the mobile device. The tests can be selected based on the type of document that was imaged, the type of mobile application for which the image quality of the mobile image is being assessed, and/or other parameters such as the type of mobile device and/or the characteristics of the camera of the mobile device that was used to capture the image. In some embodiments, the image quality assurance techniques can be implemented on a remote server, such as a mobile phone carrier's server or a web server, and the mobile device routes the mobile image to be assessed and optional processing parameters to the remote server processing and the test results can be passed from the remote server to the mobile device.

According to an embodiment, a mobile document image quality assurance system for assessing the quality of mobile document images captured by a mobile device is provided. The system includes a preprocessing module and a test execution module. The preprocessing module is configured to receive a mobile document image captured using a camera of a mobile device and processing parameters for configuring the system for testing the mobile document image, extract a document subimage from the mobile document image, the document subimage, and select one or more mobile image quality assurance tests to be performed on the mobile image based at least in part on the processing parameters. The test execution module is configured to execute the one or more mobile image quality assurance tests on the document subimage to assess the quality of the mobile image, and reject the mobile document image if the image fails at least one mobile image quality test.

According to another embodiment, a computer-implemented method for assessing the quality of mobile document images captured by a mobile device is provided. The method includes receiving a mobile document image captured using a camera of a mobile device and processing parameters for configuring the system for testing the mobile document image, extracting a document subimage from the mobile document image, the document subimage, selecting one or more mobile image quality assurance tests to be performed on the mobile image based at least in part on the processing parameters, executing the one or more mobile image quality assurance tests on the document subimage to assess the quality of the mobile image, and rejecting the mobile document image if the image fails at least one mobile image quality test.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
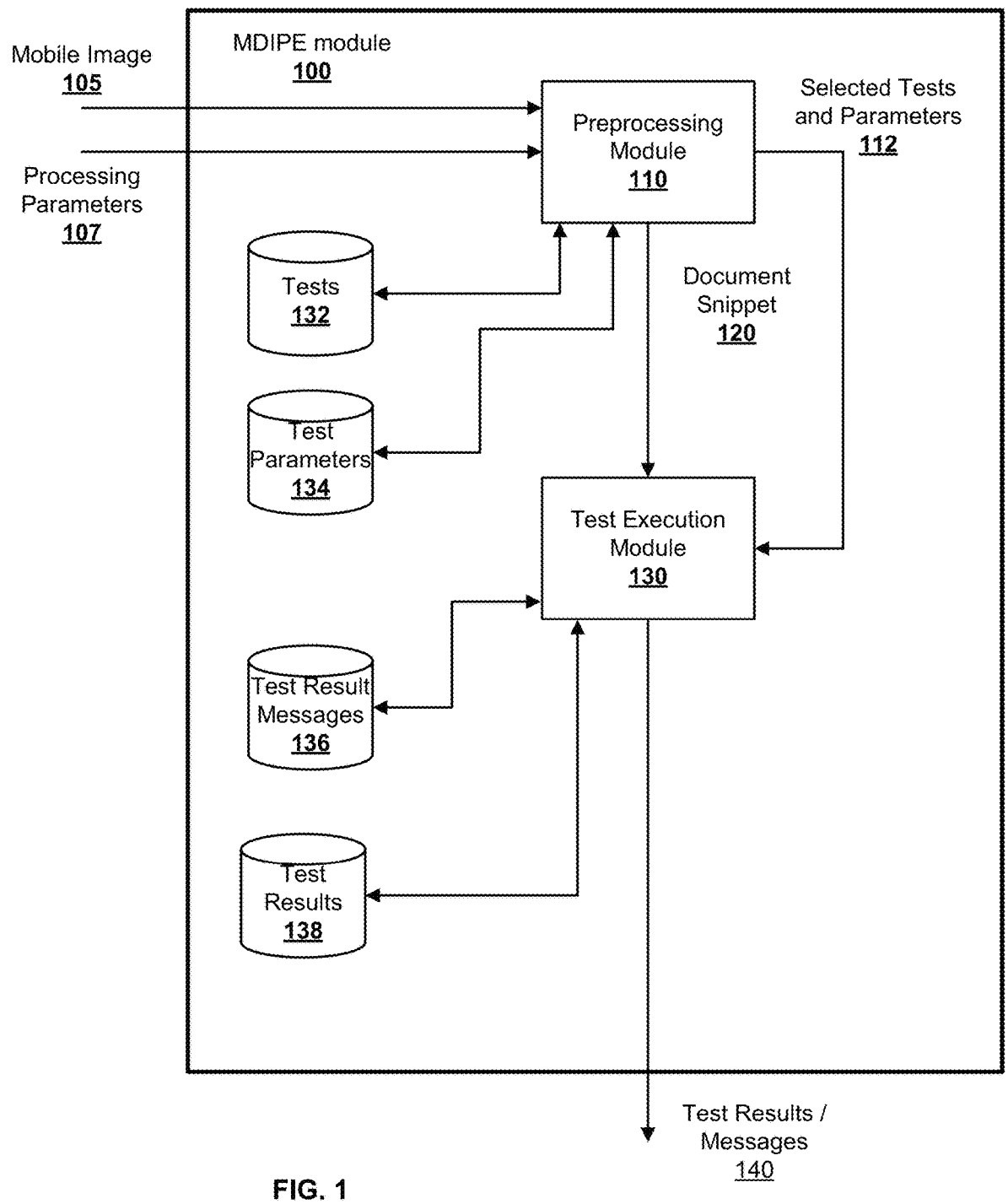
FIG. 1 is a high level block diagram of a system for performing mobile image quality assurance according on images captured by a mobile device.

The following detailed description is directed to certain specific embodiments. However, it will be understood that these embodiments are by way of example only and should not be seen as limiting the systems and methods described herein to the specific embodiments, architectures, etc. In this description, reference is made to the drawings wherein like parts are designated with like numerals throughout.

Techniques for assuring the good quality of image (also referred to herein as "mobile images" or "mobile document images") taken by cameras on a mobile device, such as a mobile phone, are provided herein. These techniques include a mobile document image processing engine that can select various mobile image quality assurance tests (also referred to herein as "mobile IQA tests") that can be executed on an image or images of a document captured using a camera of the mobile device. These tests can be configured to ensure that the quality of the mobile document image is sufficient for processing by a mobile application that can process documents captured in an image. The tests are fully configurable and can be configured based on various criteria, such as the type of document being image, the type of mobile device used to capture the image, and/or the type of mobile application for which the mobile document image was captured. If the mobile document image fails one or more tests, the user of the mobile device can be provided with a detailed explanation as to why the mobile document image failed these tests. The detailed explanation can include detailed guidance to assist the user in eliminating or at least minimizing defects in the mobile document image. This guidance can assist the user in capturing a higher quality image of the document with the mobile device.

The mobile image quality assurance systems and methods described herein can be used to test the quality of various types of mobile document images, such images of checks, receipts, business, cards, etc. According to an embodiment, specific tests can be developed for identifying problems with mobile images for specific types of documents. For example, some of the embodiments describing test methods that can be used with the mobile image quality assurance system are directed to methods for verifying the quality of images of checks and can be used in conjunction with mobile deposit applications to ensure that the quality of images of checks are high enough to be processed by the Mobile Deposit application, such as that described in related U.S. patent application Ser. No. 12/346,071 (referred to herein as the "'071 application"), U.S. patent application Ser. No. 12/346,091 (referred to herein as the "'091 application"), and U.S. patent application Ser. No. 12/717,080 (referred to herein as the "'080 application"). Furthermore, in some embodiments, tests can be performed to determine whether the correct type of document has been imaged. The test can be configured to fail a mobile document image causing the image to be rejected by the mobile image quality assurance system if the expected type of document is not found. For example, a mobile application might be used to capture an image of a check for processing. If the user instead captures an image of a sales receipt from a store, the test can recognize that the proper type of document for the mobile application was not imaged.

According to some embodiments, the mobile image quality assurance system disclosed herein can be integrated with one or more mobile applications that process mobile document images, such as mobile deposit applications for processing images of checks to be deposited into a bank account or contacts or social networking applications where images of business cards can be processed in order to extract information from the business card. According to an embodiment, the mobile application can run on the mobile device and can be integrated to use mobile image quality assurance functionality that is implemented on the mobile device and/or on a remote server. The mobile application can use the mobile image quality assurance system to assess whether a mobile image is of a high enough quality for processing by the mobile image.

Image quality can be impacted by a number of factors. The characteristics of the camera of the mobile device can have a significant impact on the quality of images captured by the mobile device. For example, some characteristics that can affect the quality of images captured using the mobile device include the presence or lack of an auto-focus feature in camera, the presence or lack of a flash in the camera; the image resolution of the camera, i.e., the number of image sensor elements that the camera includes; and the image compression used by the camera for storing the captured images. For example, the use of a high level of image compression can result in degraded image quality depending on how lossy of an image compression technique is applied by the camera.

Image quality of images captured by a mobile device can also be affected by numerous environmental factors that depend upon the context in which the image was captured. For example, the location of a document within the camera's frame or view. The user may not have centered the document in the frame, the document may be skewed relative to the frame, or both. The position of the camera relative to the document being imaged can also affect the image quality. For example, the angle that the user holds the mobile device relative to the document can affect the quality of the image captured. The location of light sources relative to the camera and/or the document can also greatly affect the quality of the image capture. The exposure time used by the camera when capturing an image of a document can also negatively affect image quality. Furthermore, the color or colors of the background surrounding a document being captured can also affect the image quality.

As a result of environmental factors, many mobile images of documents have various geometrical defects, such as skewing; warping; cut-off corners or sides of the documents, where a portion of the image was out of frame; as well as such defects as blurriness; shadows; poor contrast; unequal brightness; etc.

It is important to note that both camera characteristics and environmental factors are specific to mobile imaging. These problems simply don't exist in case of scanned document images. In other words, flat-bed (or transport) scanners generate images which lack the defects mentioned above. Many of the defects described above are eliminated simply by automatic cropping of document image supported by most of flat-bed scanners, or by fixed lighting conditions used in scanners, or by flattening the document under closed scanner lid.

A camera's characteristics are generally fixed, meaning that the user of the mobile device often does not have the ability alter the configuration of the camera or may only be able to do so to a very limited extent; however, a user may be able to change some or even most of the environmental factors that can negatively impact the quality of a mobile image. The mobile image quality assurance techniques described herein can be used in conjunction with mobile applications to evaluate mobile images against various thresholds, detect bad images, reject the bad images, and provide a precise explanation of why the image has been rejected to a user of the mobile device. By informing the user as to what was wrong with a mobile image, the user is much more likely to be able to correct some of factors that contributed to the image being rejected and significantly increase the likelihood that the user will be able to successfully take a high-quality image of the document that can be used by the mobile application.

Some problems can be addressed by fixing the problem detected by the mobile image quality assurance system. For example, if an image is rejected for failing an Image Focus Image Quality Assurance test, the user may be able to improve the image quality by simply illuminating the document being image with more light, by simply holding the mobile device steadier while taking the picture to avoid motion blur, or both. However, some problems detected by the system cannot be corrected by simply retaking another image of the document. For example, an image of a check can be rejected if the MICR-line on the check cannot be clearly detected in the image. MICR stands for Magnetic Ink Character Recognition. Information can be printed on the front of a check in a special typeface using a special magnetized ink. A MICR IQA test can use optical character recognition techniques to identify the MICR information on a check. If the MICR line on the front of the check is damaged, simply retaking an image of the check will not correct the defects in the image and the image will be rejected; however, if the MICR line was merely blurry or unreadable due to one or more of the factors described above, retaking the image after correcting one or more of factors may result in a high-enough quality image that the MICR line can be read from the check.

According to an embodiment, the mobile IQA logic can be dynamically adjusted "on-the-fly" to avoid repeating the same rejections for a mobile document image. According to an embodiment, test parameters used by mobile IQA tests can be adjusted to minimize the false reject rate where mobile images are rejected that are of sufficient image quality to be processed by a mobile application and/or the false accept rate of images where the image are accepted that are not of sufficient quality to be processed by a mobile application. Furthermore, in an embodiment, tests can be configured for the specific type of mobile device used to capture the image. For example, different camera phones have cameras with different optics, which can result in very different image quality. As a result, some image quality defects may be avoidable on some camera phones but be unavoidable other camera phones. To mitigate the differences between mobile devices configurations, the mobile IQA tests can be configured for the type of mobile device that is being used to capture the mobile image.

FIG. 1 illustrates a mobile document image processing engine (MDIPE) module 100 for performing quality assurance testing on mobile document images according to an embodiment. The MDIPE module 100 can receive a mobile document image captured by a mobile device, or multiple mobile images for some tests; perform preprocessing on the mobile document image; select tests to be performed on the mobile document image; and execute the selected tests to determine whether the quality of the image of a high enough quality for a particular mobile application. The MDIPE module 100 includes a preprocessing module 110 and test execution module 130. The preprocessing module 110 can be configured to receive a mobile image 105 captured using a camera of a mobile device as well as processing parameters 107. According to an embodiment, the mobile image 105 and the processing parameters 107 can be passed to MDIPE 100 by a mobile application on the mobile device where the mobile application provides the mobile image 105 to the MDIPE 100 to have the quality of the mobile image 105 assessed.

The processing parameters 107 can include various information that the MDIPE 100 can use to determine which tests to run on the mobile image 105. For example, the processing parameters 107 can identify the type of device used to capture the mobile image 105, the type of mobile application that will be used to process the mobile image if the mobile image passes the IQA testing, or both. The MDIPE 100 can use this information to determine which tests to select from test data store 132 and which test parameters to select from test parameter data store 134. For example, if a mobile image is being tested for a mobile deposit application that expects an image of a check, a specific set of tests related to assessing the image quality for a mobile image of a check can be selected, such as an MICR-line test, or a test for whether an image is blurry, etc. The MDIPE 100 can also select test parameters from test parameters data store 134 that are appropriate for the type of image to be processed, or for the type of mobile device that was used to capture the image, or both. In an embodiment, different parameters can be selected for different mobile phones that are appropriate for the type of phone used to capture the mobile image. For example, some mobile phones might not include an autofocus feature.

The preprocessing module 110 can process the mobile document image to extract a document snippet that includes the portion of the mobile document that actually contains the document to be processed. This portion of the mobile document image is also referred to herein as the document subimage. The preprocessing module 110 can also perform other processing on the document snippet, such as converting the image to a grayscale or bi-tonal document snippet, geometric correction of the document subimage to remove view distortion, etc. Different tests can require different types of preprocessing to be performed, and the preprocessing module 110 can produce mobile document snippets from a mobile document image depending on the types of mobile IQA tests to be executed on the mobile document image.

The test execution module 130 receives the selected tests and test parameters 112 and the preprocessed document snippet (or snippets) 120 from the preprocessing mobile 110. The test execution module 130 executes the selected tests on the document snippet generated by the processing engine 130. The test execution module 130 also uses the test parameters provided by the preprocessing module 110 when executing the test on the document snippet. The selected tests can be a series of one or more tests to be executed on the document snippets to determine whether the mobile document image exhibits geometrical or other defects.

The test execution module 130 executes each selected test to obtain a test result value for that test. The test execution module 130 then compares that test result value to a threshold value associated with the test. If the test result value is equal to or exceeds the threshold, then the mobile image has passed the test. Otherwise, if the test result value is less than the threshold, the mobile document image has failed the test. According to some embodiments, the test execution module 130 can store the test result values for the tests performed in test results data store 138.

According an embodiment, the test threshold for a test can be stored in the test parameters data store 134 and can be fetched by the preprocessing module 110 and included with the test parameters 112 provided to the test execution module 130. According to an embodiment, different thresholds can be associated with a test based on the processing parameters 107 received by the preprocessing engine 110. For example, a lower threshold might be used for an image focus IQA test for image capture by camera phones that do not include an autofocus feature, while a higher threshold might be used for the image focus IQA test for image capture by camera phones that do include an autofocus feature.

According to an embodiment, a test can be flagged as "affects overall status." These tests are also referred to here as "critical" tests. If a mobile image fails a critical test, the MDIPE 100 rejects the image and can provide detailed information to the mobile device user explaining why the image was not of a high enough quality for the mobile application and that provides guidance for retaking the image to correct the defects that caused the mobile document image to fail the test, in the event that the defect can be corrected by retaking the image.

According to an embodiment, the test result messages provided by the MDIPE 100 can be provided to the mobile application that requested the MDIPE 100 perform the quality assurance testing on the mobile document image, and the mobile application can display the test results to the user of the mobile device. In certain embodiments, the mobile application can display this information on the mobile device shortly after the user takes the mobile document image to allow the user to retake the image if the image is found to have defects that affect the overall status of the image. In some embodiments, where the MDIPE 100 is implemented at least in part on the mobile device, the MDIPE 100 can include a user interface module that is configured to display the test results message on a screen of the mobile device.

FIG. 1 merely provides a description of the logical components of the MDIPE 100. In some embodiments, the MDIPE 100 can be implemented on the mobile device, in software, hardware, or a combination thereof. In other embodiments, the MDIPE 100 can be implemented on a remote server, and the mobile device can send the mobile image 105 and the processing parameters 107, e.g., via a wireless interface, to the remote server 108 for processing, and the remote server sends the test results and test messages 140 to the mobile device to indicate whether the mobile image passed testing. In some embodiments, part of the functionality of the MDIPE 100 can be implemented on the mobile device while other parts of the MDIPE 100 are implemented on the remote server. The MDIPE 100 can be implemented in software, hardware, or a combination thereof. In still other embodiments, the MDIPE 100 can be implemented entirely on the remote server, and can be implemented using appropriate software, hardware, or a combination there.

Figure 2:
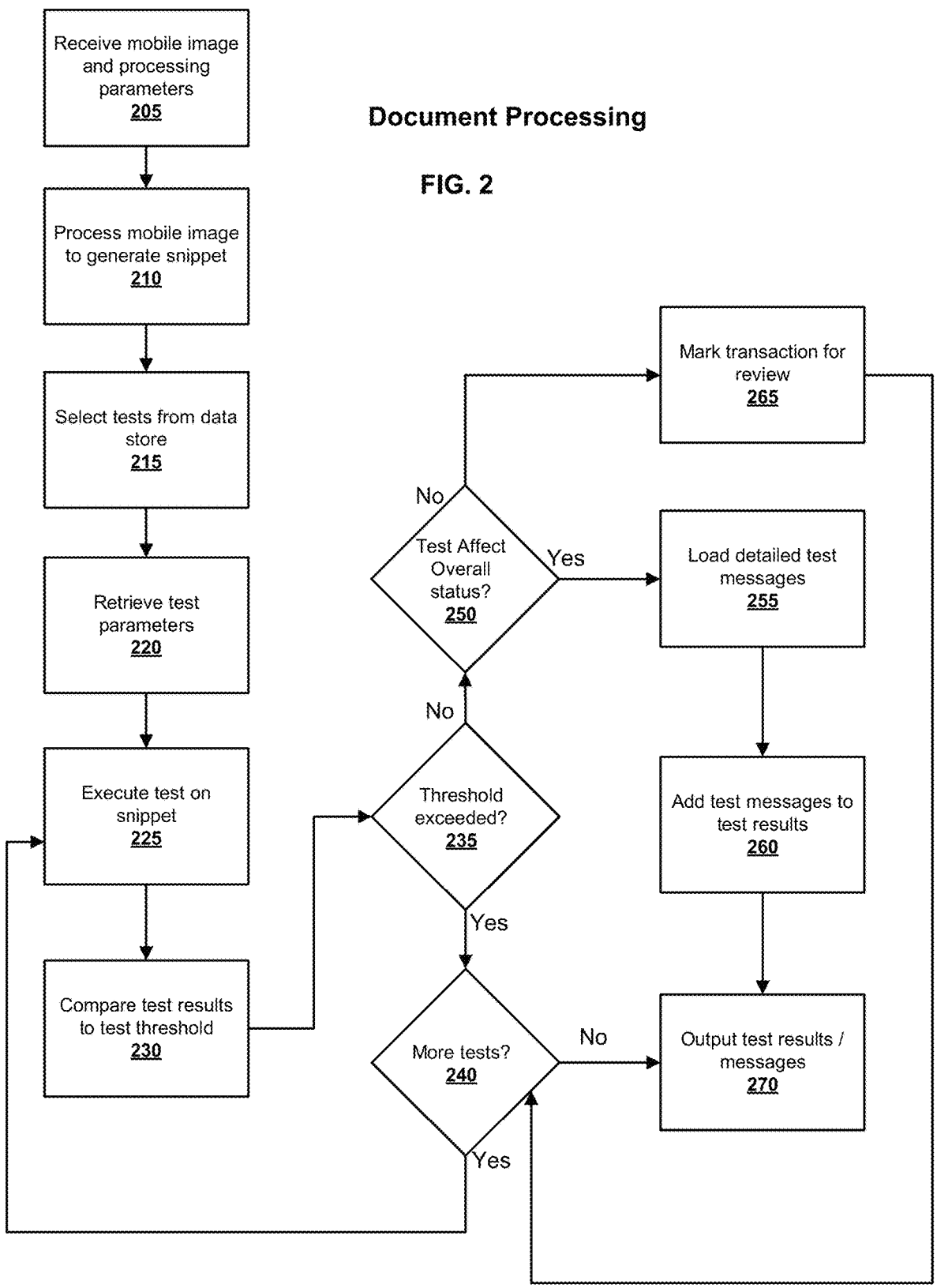
FIG. 2 is a flow diagram of a process for performing mobile image quality assurance on an image captured by a mobile device according to an embodiment.

FIG. 2 is a flow diagram of a process for performing mobile image quality assurance on an image captured by a mobile device according to an embodiment. The process illustrated in FIG. 2 can be performed using the MDIPE 100 illustrated in FIG. 1.

The mobile image 105 captured by a mobile device is received (step 205). The mobile image 105 can also be accompanied by one or more processing parameters 107.

As described above, the MDIPE 100 can be implemented on the mobile device, and the mobile image can be provided by a camera that is part of or coupled to the mobile device. In some embodiments, the MDIPE 100 can also be implemented at least in part on a remote server, and the mobile image 105 and the processing parameters 107 can be transmitted to the remove server, e.g., via a wireless interface included in the mobile device.

Once the mobile image 105 and the processing parameters 107 have been received, the mobile image is processed to generate a document snippet or snippets (step 210). For example, preprocessing module 110 of MDIPE 100 can be used to perform various preprocessing on the mobile image. One part of this preprocessing includes identifying a document subimage in the mobile image. The subimage is the portion of the mobile document image that includes the document. The preprocessing module 110 can also perform various preprocessing on the document subimage to produce what is referred to herein as a "snippet." For example, some tests can require that a grayscale image of the subimage be created. The preprocessing module 110 can create a grayscale snippet that represents a grayscale version of the document subimage. In another example, some tests can require that a bitonal image of the subimage be created. The preprocessing module 110 can create a bitonal snippet that represents a bitonal version of the document subimage. In some embodiments, the MDIPE 100 can generate multiple different snippets based on the types of tests to be performed on the mobile document image.

After processing the mobile document image to generate a snippet, the MDIPE 100 then selects one or more tests to be performed on the snippet or snippets (step 215). In an embodiment, the tests to be performed can be selected from test data store 132. In an embodiment, the MDIPE 100 selects the one or more tests based on the processing parameters 107 that were received with the mobile image 105.

After selecting the tests from the test data store 132, test parameters for each of the tests can be selected from the test parameters data store 134 (step 220). According to an embodiment, the test parameters can be used to configure or customize the tests to be performed. For example, different test parameters can be used to configure the tests to be more or less sensitive to certain attributes of the mobile image. In an embodiment, the test parameters can be selected based on the processing parameters 107 received with the mobile image 105. As described above, these processing parameters can include information, such as the type of mobile device used to capture the mobile image as well as the type of mobile application that is going to be used to process the mobile image if the mobile image passes scrutiny of the mobile image IQA system.

Once the tests and the test parameters have been retrieved and provided to the test execution module 130, a test is selected from tests to be executed, and the test is executed on the document snippet to produce a test result value (step 225). In some embodiments, more than one document snippet may be used by a test. For example, a test can be performed that tests whether images of a front and back of a check are actually images of the same document can be performed. The test engine can receive both an image of the front of the check and an image of the back of the check from the preprocessing engine 110 and use both of these images when executing the test.

The test result value obtained by executing the test on the snippet or snippets of the mobile document is then compared to test threshold to determine whether the mobile image passes or fails the test (step 230) and a determination is made whether the test results exceed the threshold (step 235). According to an embodiment, the test threshold can be configured or customized based on the processing parameters 107 received with the mobile image. For example, the test for image blurriness can be configured to use a higher threshold for passing if the image is to be used to for a mobile deposit application where the MICR-line information needs to be recognized and read from the document image. In contrast, the test for blurriness can be configured use a lower threshold for passing the mobile image for some mobile applications. For example, the threshold for image quality may be lowered for if a business card is being imaged rather than a check. The test parameters can be adjusted to minimize the number of false rejects and false accept rate, the number of images marked for reviewing, or both.

The "affects overall status" flag of a test can also be configured based on the processing parameters 107. For example, a test can be marked as not affecting the overall status for some types of mobile applications or for documents being processed, or both. Alternatively, a test can also be marked as affecting overall status for other types of mobile applications or documents being processed, or both. For example, a test that identifies the MICR-line of a check can be marked as "affecting overall status" so that if the MICR-line on the check cannot be identified in the image, the image will fail the test and the image will be rejected. In another example, if the mobile application is merely configured to receive different types of mobile document image, the mobile application can perform a MICR-line test on the mobile document image in an attempt to determine whether the document that was imaged was a check. In this example, the MICR-line may not be present, because a document other than a check may have been imaged. Therefore, the MICR-line test may be marked as not "affecting overall status," and if a document fails the test, the transaction might be flagged for review but not marked as failed.

Since different camera phones can have cameras with very different optical characteristics, image quality may vary significantly between them. As a result, some image quality defects may be avoidable on some camera phones and unavoidable on the others and therefore require different configurations. To mitigate the configuration problem, Mobile IQA test can be automatically configured for different camera phones to use different tests, or different thresholds for the tests, or both. For example, as described above, a lower threshold can be used for an image focus IQA test on mobile document images that are captured using a camera phone that does not include an autofocus feature than would be used for camera phones that do include an autofocus feature, because it can be more difficult for a user to obtain as clear an image on using a device that doesn't an autofocus feature.

In certain embodiments, if the test result exceeded or equaled the threshold, the image passed the test and a determination is made whether there are more tests to be executed (step 240). If there are more tests to be executed, the next test can be selected and executed on the document snippet (step 225). Otherwise, if there were not more tests to be executed, the test results, or test messages, or both are output by MDIPE 100 (step 270). There can be one or more test messages included with the results if the mobile image failed one more of the tests that were executed on the image.

In such embodiments, if the test result was less than the threshold, then the mobile image has failed the test. A determination is made whether the test affects the overall status (step 250). If the test affects the overall status of the image, detailed test result messages that explain why the image failed the test can be loaded from the test message data store 134 (step 255) and the test result messages can be added to the test results (step 260). The test results and test messages can then be output by the MDIPE 100 (step 270).

Alternatively, if the test did not affect the overall status, the test results can be loaded noted and the transaction can be flagged for review (step 265). By flagging the transaction for review, a user of a mobile device can be presented with information indicating that a mobile image has failed at least some of the test that were performed on the image, but the image still may be of sufficient quality for use with the mobile application. The user can then be presented with the option to retake the image or to send the mobile image to the mobile application for processing. According to some embodiments, detailed test messages can be loaded from the test message data store 134 for all tests that fail and can be included with the test results, even if the test is not one that affects the overall status of the mobile image.

According to some embodiments, the mobile IQA test can also be configured to eliminate repeated rejections of a mobile document. For example, if an image of a check is rejected as have too low a contrast by a contrast test, the image is rejected, and the user can retake and resubmit the image via the mobile application, the processing parameters 107 received with the mobile image can include a flag indicating that the image is being resubmitted. In some embodiments, the thresholds associated with the tests that the image failed can be lowered to see if the image can pass the test with a lower threshold. In some embodiments, the thresholds are only lowered for non-critical tests. According to an embodiment, the processing parameters 107 can also include a count of the number of times that an image has been resubmitted and the thresholds for a test are only lowered after a predetermined number of times that the image is resubmitted.

Figure 3:
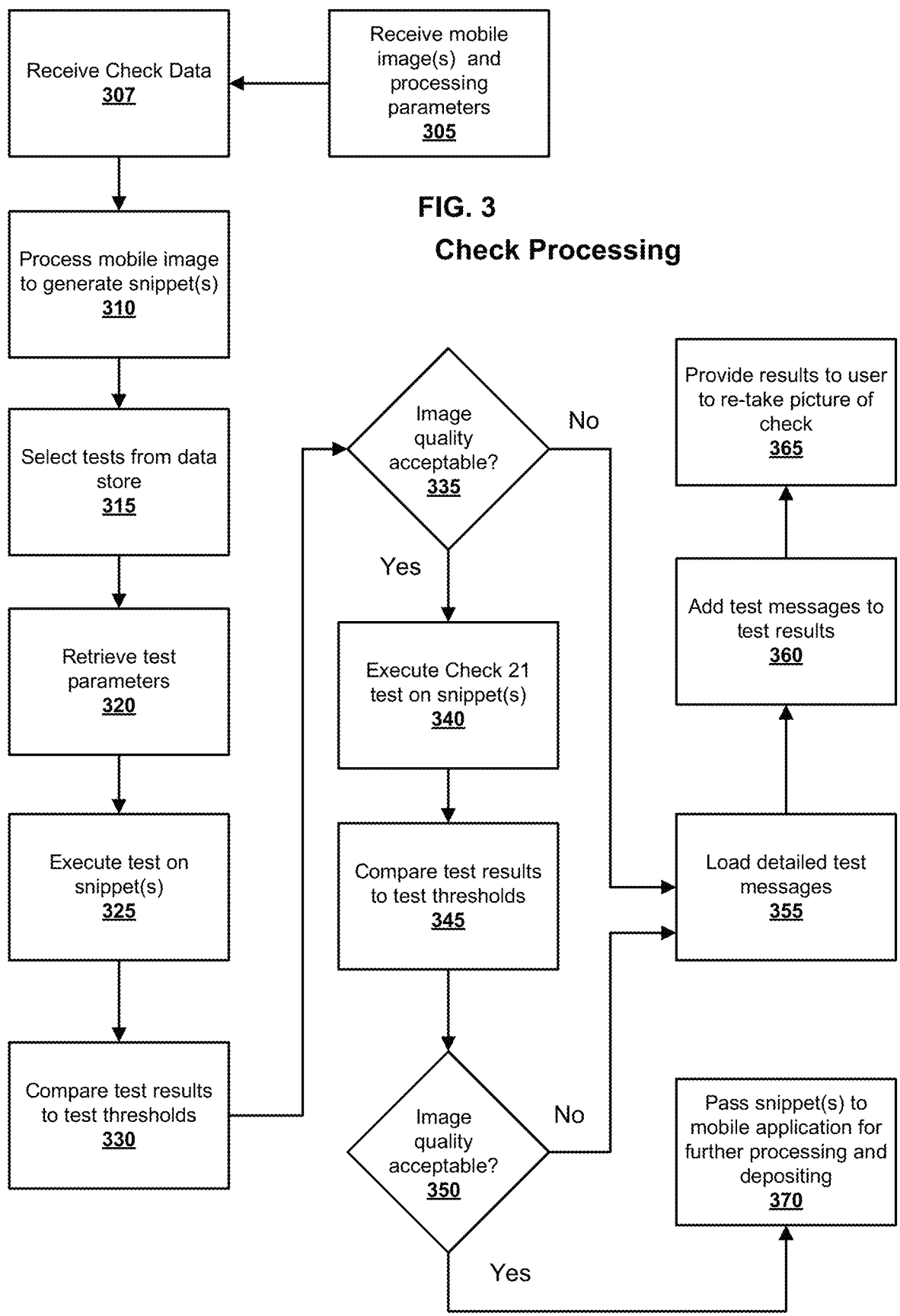
FIG. 3 is a flow diagram of a process for performing mobile image quality assurance on an image of a check captured by a mobile device according to an embodiment.

FIG. 3 is a flow diagram of a process for performing mobile image quality assurance on an image of a check captured by a mobile device according to an embodiment. Like the process illustrated in FIG. 2, the process illustrated in FIG. 3 can be performed using the MDIPE 100 illustrated in FIG. 1. The method illustrated in FIG. 3 illustrates how the mobile IQA and MDIPE 100 can be used with the electronic check processing provided under the Check Clearing for the 21st Century Act. The Check Clearing for the 21st Century Act (also referred to as the "Check 21 Act") is a United States federal law (Pub.L. 108-100) that was enacted on Oct. 28, 2003. The law allows the recipient of a paper check to create a digital version of the original check called a "substitute check," which can be processed, eliminating the need to process the original physical document. The substitute check includes an image of the front and back sides of the original physical document. The mobile IQA tests can be used check the quality of the images captured by a mobile device. The snippets generated by the MDIPE 100 can then be further tested by one or more Check 21 mobile IQA tests that perform image quality assurance on the snippets to determine whether the images meet the requirements of the Check 21 Act as well.

The mobile image 105 captured by a mobile device is received (step 305). In an embodiment, image of the front and back sides of the check can be provided. The mobile image 105 can also be accompanied by one or more processing parameters 107. Check data can also be optionally received (step 307). The check data can be optionally provided by the user at the time that the check is captured. This check data can include various information from the check, such as the check amount, check number, routing information from the face of the check, or other information, or a combination thereof. In some embodiments, a mobile deposition application requests this information from a user of the mobile device, allows the user to capture an image of a check or to select an image of a check that has already been captured, or both, and the mobile deposit information provides the check image, the check data, and other processing parameters to the MDIPE 100.

Once the mobile image 105, the processing parameters 107, and the check data have been received, the mobile image is processed to generate a document snippet or snippets (step 310). As described above, the preprocessing can produce one or more document snippets that include the portion of the mobile image in which the document was located. The document snippets can also have additional processing performed on them, such as conversion to a bitonal image or to grayscale, depending on the types of testing to be performed.

After processing the mobile document image to generate a snippet, the MDIPE 100 then selects one or more tests to be performed on the snippet or snippets (step 315). In an embodiment, the tests to be performed can be selected from test data store 132. In an embodiment, the MDIPE 100 selects the one or more tests based on the processing parameters 107 that were received with the mobile image 105.

After selecting the tests from the test data store 132, test parameters for each of the tests can be selected from the test parameters data store 134 (step 320). As described above, the test parameters can be used to configure or customize the tests to be performed.

Once the tests and the test parameters have been retrieved and provided to the test execution module 130, a test is selected from tests to be executed, and the test is executed on the document snippet to produce a test result value (step 325). In some embodiments, more than one document snippet can be used by a test. For example, a test can be performed that tests whether images of a front and back of a check are actually images of the same document can be performed. The test engine can receive both an image of the front of the check and an image of the back of the check from the preprocessing engine 110 and use both of these images when executing the test. Step 325 can be repeated until each of the tests to be executed is performed.

The test result values obtained by executing each test on the snippet or snippets of the mobile document are then compared to test threshold with that test to determine whether the mobile image passes or fails the test (step 330) and a determination can be made whether the mobile image of the check passed the test indicating that image quality of mobile image is acceptable (step 335). If the mobile document image of the check passed, the MDIPE 100 passes then executes one or more Check 21 tests on the snippets (step 340).

The test result values obtained by executing the Check 21 test or tests on the snippet or snippets of the mobile document are then compared to test threshold with that test to determine whether the mobile image passes or fails the test (step 345) and a determination can be made whether the mobile image of the check passed the test indicating that image quality of mobile image is acceptable under the requirements imposed by the Check 21 Act (step 350). Step 345 can be repeated until each of the Check 21 tests is performed. If the mobile document image of the check passed, the MDIPE 100 passes the snippet or snippets to the mobile application for further processing (step 370).

If the mobile document image of the check failed one or more mobile IQA or Check 21 tests, detailed test result messages that explain why the image failed the test can be loaded from the test message data store 134 (step 355) and the test result messages can be added to the test results (step 360). The test results and test messages are then output to the mobile application where they can be displayed to the user (step 365). The user can use this information to retake the image of the check in an attempt to remedy some or all of the factors that caused the image of the check to be rejected.

Mobile IQA Tests

FIGS. 4-21 illustrate various sample mobile document images and various testing methods that can be performed when assessing the image quality of a mobile document image. As described above, the preprocessing module 110 can be configured to extract the document subimage, also referred to herein as the subimage, from the mobile document image. The subimage generally will be non-rectangular because of perspective distortion; however, the shape of the subimage can generally be assumed to be quadrangular, unless the subimage is warped. Therefore, the document can be identified by its four corners.

In some embodiments, a mobile IQA test generates a score for the subimage on a scale that ranges from 0-1000, where "0" indicates a subimage having very poor quality while a score of "1000" indicates that the image is perfect according to the test criteria.

Figure 4A:
FIG. 4A is an example of a mobile image captured by a mobile device according to an embodiment.
Figure 4B:
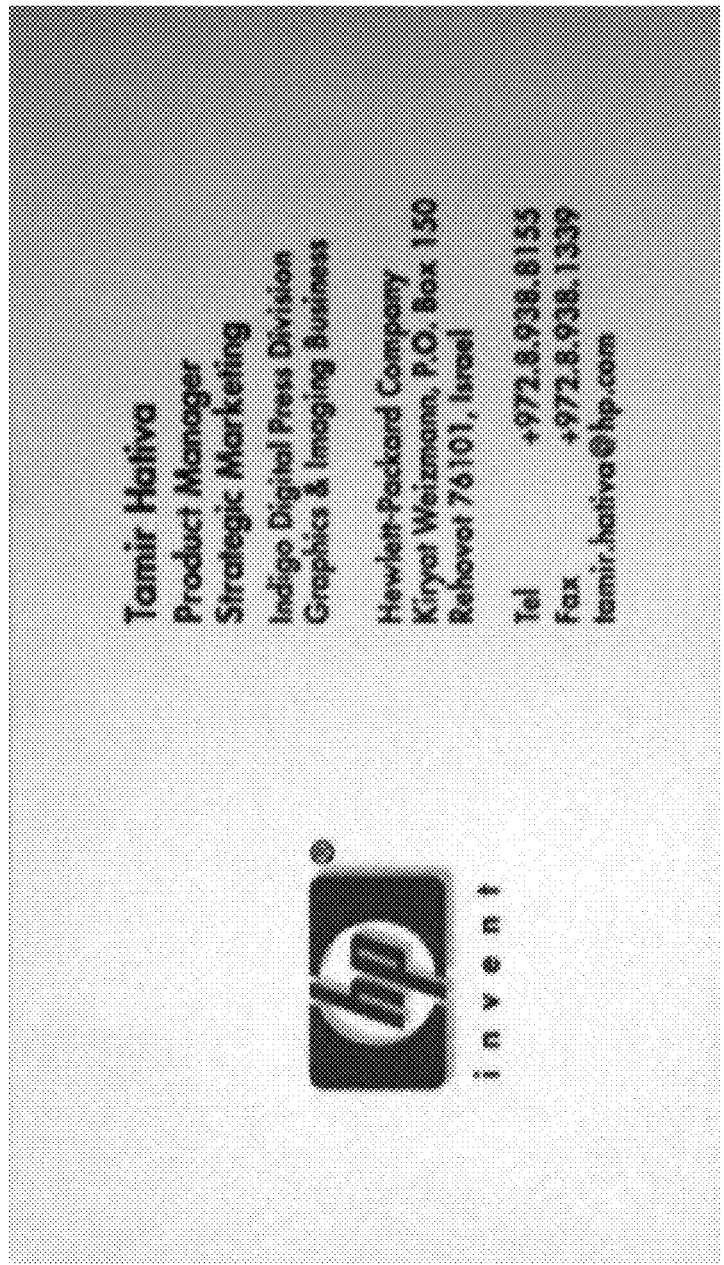
FIG. 4B is an example of a snippet generated by a mobile document image processing engine from the mobile image illustrated in FIG. 4A.

Some tests use a geometrically corrected snippet of the subimage to correct view distortion. The preprocessing module 110 can generate the geometrically corrected snippet. FIG. 4A illustrates a mobile image where the document captured in the mobile document image exhibits view distortion. FIG. 4B illustrates an example of a grayscale geometrically corrected subimage generated from the distorted image in FIG. 4A.

Image Focus IQA Test

According to some embodiments, an Image Focus IQA Test can be executed on a mobile image to determine whether the image is too blurry to be used by a mobile application. Blurry images are often unusable, and this test can help to identify such out-of-focus images and reject them. The user can be provided detailed information to assist the user in taking a better quality image of the document. For example, the blurriness may have been the result of motion blur caused by the user moving the camera while taking the image. The test result messages can suggest that the user hold the camera more steady when retaking the image.

Mobile devices can include cameras that have significantly different optical characteristics. For example, a mobile device that includes a camera that has an auto-focus feature can generally produce much sharper images than a camera that does not include such a feature. Therefore, the average image focus score for different cameras can vary widely. As a result, the test threshold can be set differently for different types of mobile devices. As described above, the processing parameters 107 received by MDIPE 100 can include information that identifies the type of mobile device and/or the camera characteristics of the camera used with the device in order to determine what the threshold should be set to for the Image Focus IQA Test.

Figure 5A:
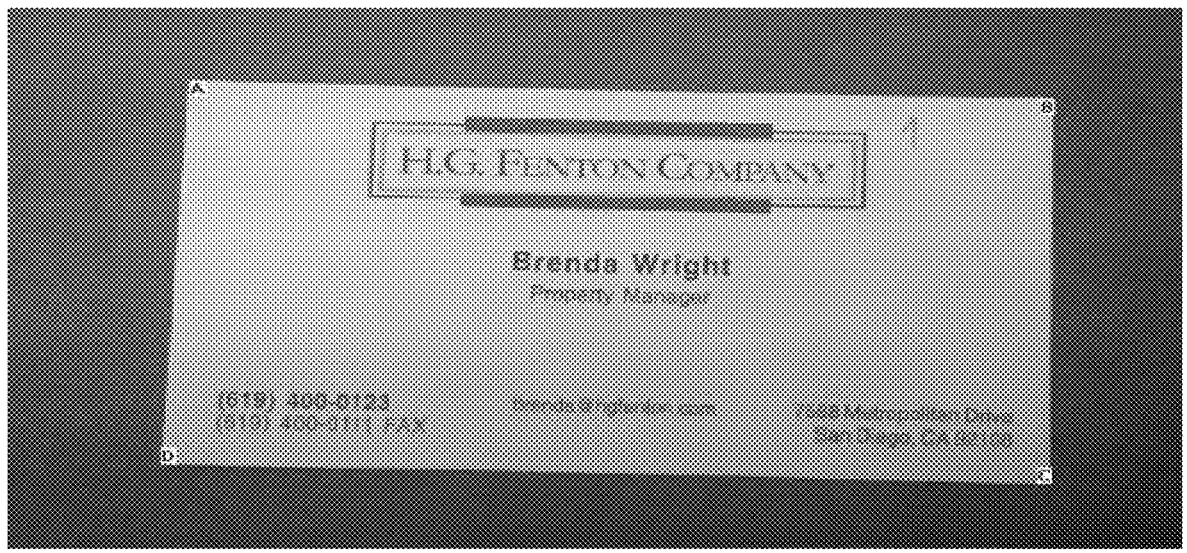
FIG. 5A is an example of a mobile image captured by a mobile device according to an embodiment.
Figure 5B:
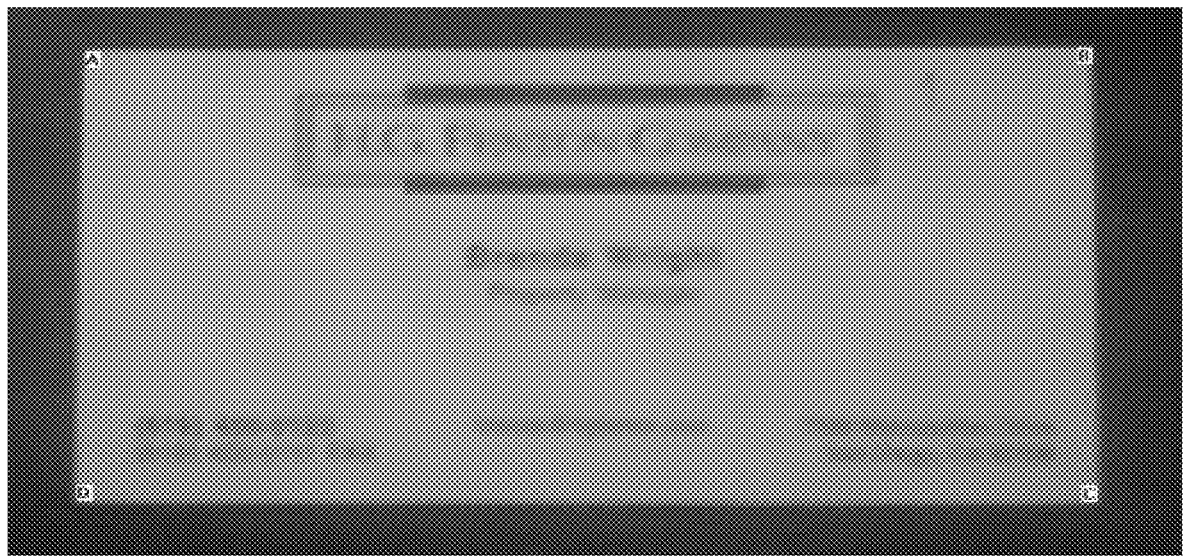
FIG. 5B is an example of a blurry mobile image of the document illustrated in FIG. 5A according to an embodiment.

An in-focus mobile document image, such as that illustrated in FIG. 5A will receive a score of 1000, while an out of focus document, such as that illustrated in FIG. 5B will receive a much lower score, such as in the 50-100 range. Most of the time, images are not completely out of focus. Therefore, a score of 0 is uncommon.

According to an embodiment, the focus of the image can be tested using various techniques, and the results can then be normalized to the 0-1000 scale used by the MDIPE 100.

In an embodiment, the Image Focus Score can be computed using the following technique: The focus measure is a ratio of maximum video gradient between adjacent pixels, measured over the entire image and normalized with respect to image's gray level dynamic range and "pixel pitch." According to an embodiment, the image focus score can be calculated using the following equation described in "The Financial Services Technology Consortium," Image Defect Metrics, IMAGE QUALITY & USABILITY ASSURANCE: Phase 1 Project, Draft Version 1.0.4. May 2, 2005, which is hereby incorporated by reference:

$$\text{Image Focus Score} = (\text{Maximum Video Gradient}) / [(\text{Gray Level Dynamic Range}) * (\text{Pixel Pitch})]$$

$$\text{where Video Gradient} = \text{ABS}[(\text{Gray level for pixel } "i") - (\text{Gray level for pixel } "i+1")]$$

$$\text{Gray Level Dynamic Range} = [(\text{Average of the "}N\text{" Lightest Pixels}) - (\text{Average of the "}N\text{" Darkest Pixels})]$$

$$\text{Pixel Pitch} = [1/\text{Image Resolution(in dpi)}]$$

The variable N is equal to the number of pixels used to determine the average darkest and lightest pixel gray levels in the image. According to one embodiment, the value of N is set to 64. Therefore, the 64 lightest pixels in the image are averaged together and the 64 darkest pixels in the image are averaged together, to compute the "Gray Level Dynamic" range value. The resulting image focus score value is the multiplied by 10 in order to bring the value into the 0-1000 range used for the test results in the mobile IQA system.

The Image Focus Score determined using these techniques can be compared to an image focus threshold to determine whether the image is sufficiently in focus. As described above, the threshold used for each test may be determined at least in part by the processing parameters 107 provided to MDIPE 100. The Image Focus score can be normalized to the 0-1000 range used by the mobile IQA tests and compared to a threshold value associated with the test. If the Image Focus Score meets or exceeds this threshold, then the mobile document image is sufficiently focused for use with the mobile application.

Shadow Test

According to some embodiments, a Shadow Test can be executed on a mobile image to determine whether a portion of the image is covered by a shadow. A shadow can render parts of a mobile image unreadable. This test helps to identify whether a shadow coverage a least a portion of a subimage in a mobile document image, and to reject images if the shadow has too much of an effect on the image quality, so that the user can attempt to take a better quality image of the document where the shadow is not present.

Figure 6:
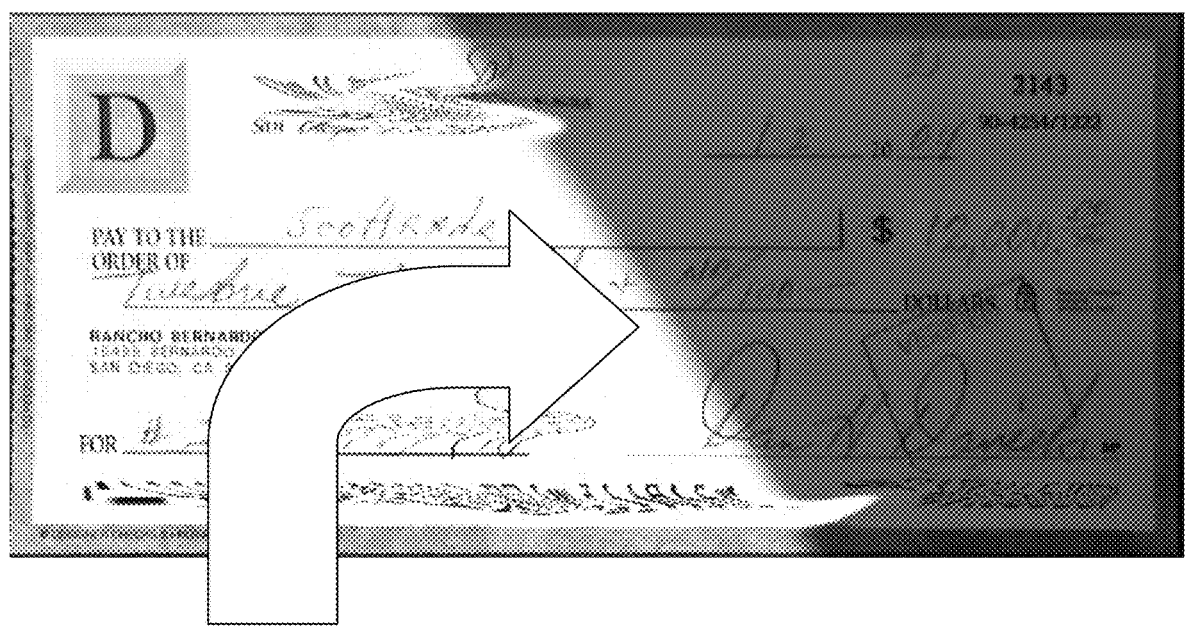
FIG. 6 is an example mobile image of a shadowed document according to an embodiment.

According to an embodiment, the presence of a shadow is measured by examining boundaries in the mobile image that intersect two or more sides of the document subimage. FIG. 6 illustrates an example of a shadowed document. The document subimage has been extracted from the mobile document image and converted to a grayscale snippet in this example. The shadow boundary clearly intersects the top and the bottom of the check pictured in the snippet.

The presence of shadows can be measured using the area and contrast. If a shadow covers the entire image, the result is merely an image that is darker overall. Such shadows generally do not worsen image quality significantly. Furthermore, shadows having a very small surface area also do not generally worsen image quality very much.

According to an embodiment, the Image Shadowed Score can be calculated using the following formula to determine the score for a grayscale snippet:

$$\text{Image Shadowed score} = 1000 \text{ if no shadows were found, otherwise}$$

$$\text{Image Shadowed score} = 1000 - \min(\text{Score}(S[i])),$$
where $\text{Score}(S[i])$ is computed for every shadow $S[i]$ detected on the grayscale snippet In an embodiment, the Score for each shadow can be computed using the following formula:

> Given shadow $S[i]$ in the grayscale image, the score can be calculated $Score(S[i])$ as $Score(S[i])$ $=2000*\min(A[i]/A, 1-A[i]/A)*(Contrast/256)$, where $A[i]$ is the area covered by shadow $S[i]$ (in pixels), $A$ is the entire grayscale snippet area (in pixels), and Contrast is the difference of brightness inside and outside of the shadow (the maximum value is 256).

Due to the normalization factor 2000, Score(S[i]) fits into 0-1000 range. It tends to assume larger values for shadows that occupy about 2 of the snippet area and have high contrast. Score(S[i]) is typically within 100-200 range. In an embodiment, the Image Shadowed score calculated by this test falls within a range of 0-1000 as do the test results from other tests. According to an embodiment, a typical mobile document image with few shadows will have a test result value in a range form 800-900. If no shadows are on are found the document subimage, then the score will equal 1000. The Image Shadowed score can then be compared to a threshold associated with the test to determine whether the image is of sufficiently high quality for use with the mobile application requesting the assessment of the quality of the mobile document image.

Contrast Test

According to some embodiments, a Contrast Test can be executed on a mobile image to determine whether the contrast of the image is sufficient for processing. One cause of poor contrast is images taken with insufficient light. A resulting grayscale snippet generated from the mobile document image can have low contrast, and if the grayscale snippet is converted to a binary image, the binarization module can erroneously white-out part of the foreground, such as the MICR-line, amount, or black-out part of the background. The Contrast Test measures the contrast and rejects poor quality images, and instructs the user to retake the picture under brighter light to improve the contrast of the resulting snippets.

Figure 7:
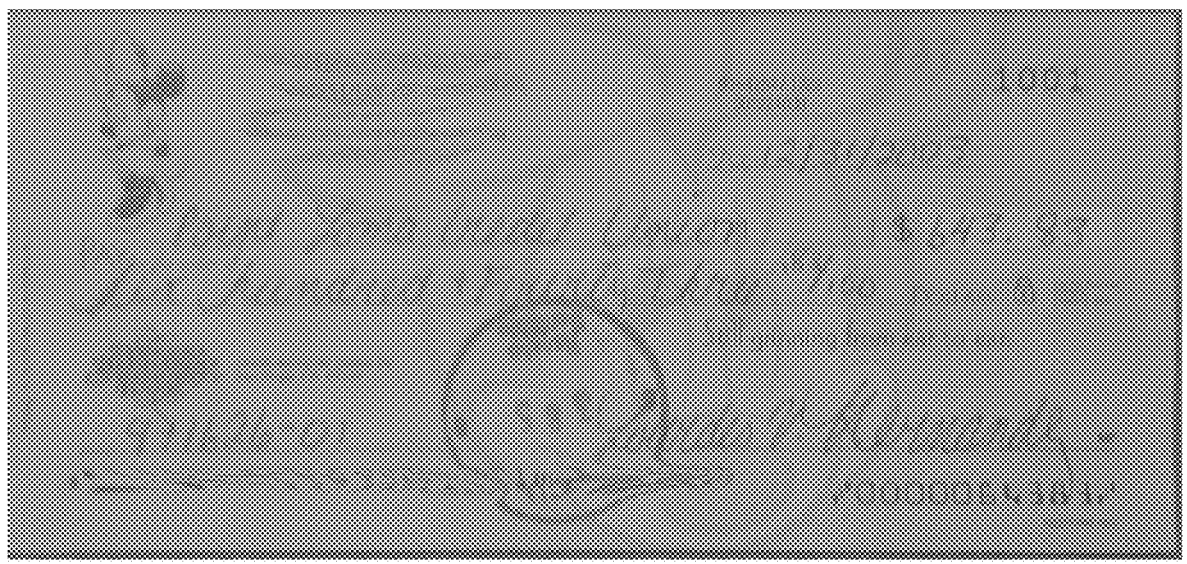
FIG. 7 is an example of a mobile image having low contrast according to an embodiment.
Figure 8:
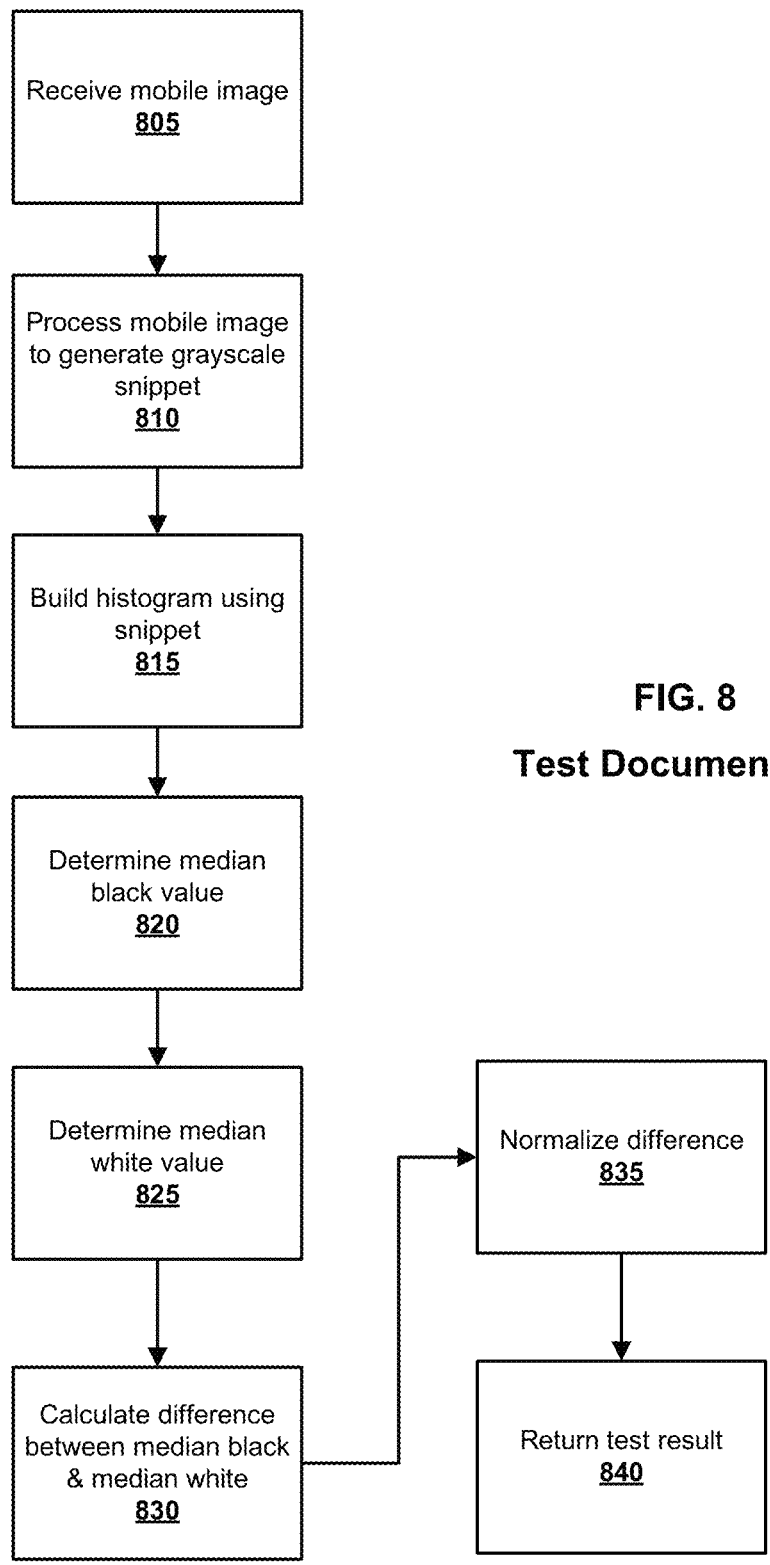
FIG. 8 is a method for testing the contrast of a mobile image according to an embodiment.

FIG. 8 illustrates a method for executing a Contrast IQA Test according to an embodiment. The Contrast IQA Test illustrated in FIG. 8 is performed on a grayscale snippet generated from a mobile document image. The MDIPE 100 receives the mobile image (step 805) and generates a grayscale snippet that comprises a grayscale version of the document subimage (step 810). FIG. 7 is an example of a grayscale snippet generated from a mobile document image of a check. As can be seen from FIG. 7, the contrast of the image is very low.

A histogram of the grayscale values in the grayscale snippet can then be built (step 815). In an embodiment, the x-axis of the histogram is divided into bins that each represents a "color" value for the pixel in the grayscale image and the y-axis of the histogram represents the frequency of that color value in the grayscale image. According to an embodiment, the grayscale image has pixel in a range from 0-255, and the histogram is built by iterating through each value in this range and counting the number of pixels in the grayscale image having this value. For example, frequency of the "200" bin would include pixels having a gray value of 200.

A median black value can then be determined for the grayscale snippet (step 820) and a median white value is also determined for the grayscale snippet (step 825). The median black and white values can be determined using the histogram that was built from the grayscale snippet. According to an embodiment, the median black value can be determined by iterating through each bin, starting with the "0" bin that represents pure black and moving progressively toward the "250" bin which represents pure white. Once a bin is found that includes at least 20% of the pixels included in the image, the median black value is set to be the color value associated with that bin. According to an embodiment, the median white value can be determined by iterating through each bin, starting with the "255" bin which represents pure white and moving progressively toward the "0" bin which represents pure black. Once a bin is found that includes at least 20% of the pixels included in the image, the median white value is set to be the color value associated with that bin.

Once the median black and white values have been determined, the difference between the median black and white values can then be calculated (step 830). The difference can then be normalized to fall within the 0-1000 test range used in the mobile IQA tests executed by the MDIPE 100 (step 835). The test result value can then be returned (step 840). As described above, the test result value is provided to the test execution module 130 where the test result value can be compared to a threshold value associated with the test. See for example, FIG. 1, step 230, described above. If the mobile image fails the Contrast IQA Test, the MDIPE 100 can reject the image, and load detailed test messages from the test message data store 134 that include detailed instructions that how the user might retake the image.

Planar Skew Test

According to some embodiments, a Planar Skew Test can be executed on a mobile image to determine whether the document subimage is skewed within the mobile image. See FIG. 9A for an example of a mobile document image that includes a check that exhibits significant planar skew. Planar skew does not result in distortion of the document subimage; however, in an embodiment, the subimage detection module included in the preprocessing module assumes that the document subimage is nearly horizontal in the mobile document image. If the skew becomes too extreme, for example approaching 45 degrees from horizontal, cropping errors could occur when the document subimage is extracted from the mobile document image.

According to an embodiment, document skew can be measured by first identifying the corners of the document subimage using one of the techniques described above. The corners of the documents subimage can be identified by the preprocessing module 130 when performing projective transformations on the subimage, such as that described above with respect to FIGS. 4A and 4B. Various techniques for detecting the skew of the subimage can be used. For example, techniques for detecting skew disclosed in the related '071 and '091 applications, can be used to detect the skew of the subimage. The results from the skew test can then be to fall within the 0-1000 test range used in the mobile IQA tests executed by the MDIPE 100. The higher the skew of the document subimage, the lower the normalized test value. If the normalized test value falls below the threshold value associated with the test, the mobile document image can be rejected and the user can be provided detailed information from the test result messages data store 136 for how to retake the image and reduce the skew.

View Skew Test

Figure 9A:
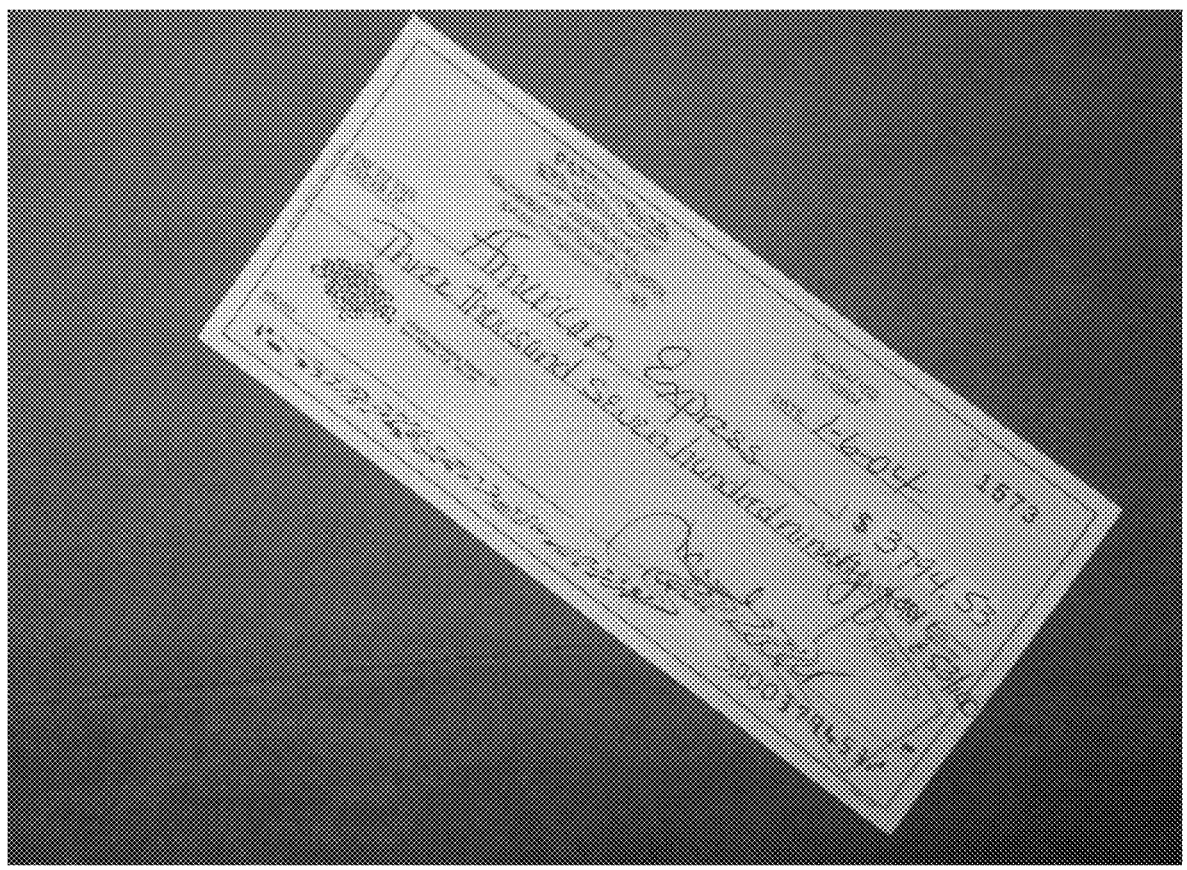
FIG. 9A is an example of a mobile image of a document having significant plane skew according to an embodiment.
Figure 9B:
FIG. 9B is an example of a mobile image of a document having view plane skew according to an embodiment.

"View skew" denotes a deviation from direction perpendicular to the document in mobile document image. Unlike planar skew, the view skew can result in the document subimage having perspective distortion. FIG. 9B illustrates an example of a document subimage that exhibits view skew. View skew can cause problems in processing the subimage if the view skew becomes too great, because view skew changes the width-to-height ratio of the subimage. This can present a problem, since the true dimensions of the document pictured in the subimage are often unknown. For example, business checks can be various sizes and can have different width-to-height ratios. View skew can result in content recognition errors, such as errors in recognition of the MICR-line data on a check or CAR/LAR recognition (which stands for Courtesy Amount Recognition and Legal Amount Recognition). By measuring the view skew, the view skew test can be used to reject images that have too much view skew, which can help reduce false rejects and false accepts rates by addressing an issue that can be easily corrected by a user retaking the mobile document image.

Figure 10:
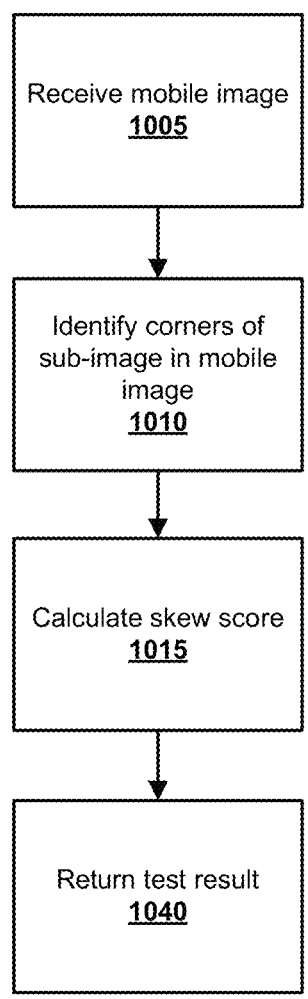
FIG. 10 is a method for testing the skew of a mobile image according to an embodiment.

FIG. 10 is a flow chart illustrating a method for testing for view skew according to an embodiment. The MDIPE 100 receives the mobile image (step 1005) and identifies the corners of the document within the subimage (step 1010). A skew test score can then be determined for the document subimage (step 1015) and skew test score can then be returned (1040). As described above, the test result value can then be provided to the test execution module 130 where the test result value can be compared to a threshold value associated with the test.

According to an embodiment, the view skew of a mobile document can be determined using the following formula:

View Skew score=1000−$F(A,B,C,D)$, where $F(A,B,C,D)=500*\max(\text{abs}(|AB|-|CD|)/(|DA|+|BC|),$
$\text{abs}(|BC|-|DA|)/(|AB|+|CD|))$, where |PQ| denotes the distance from point P to point Q, and the corners of the subimage are denoted as follows: A represents the top-left corner, B represents the top-right corner of the subimage, C represents the bottom-right corner of the subimage, and D represents the bottom-left corner of the subimage.

One can see that View Skew score can be configured to fit into [0, 1000] range used in the other mobile IQA tests described herein. In this example, the View Skew score is equal to 1000 when |AB|=|CD| and |BC|=|DA|, which is the case when there is no perspective distortion in the mobile document image and camera-to-document direction was exactly perpendicular. The View Skew score can then be compared to a threshold value associated with the test to determine whether the image quality is sufficiently high for use with the mobile application.

Cut Corner Test

Figure 11:
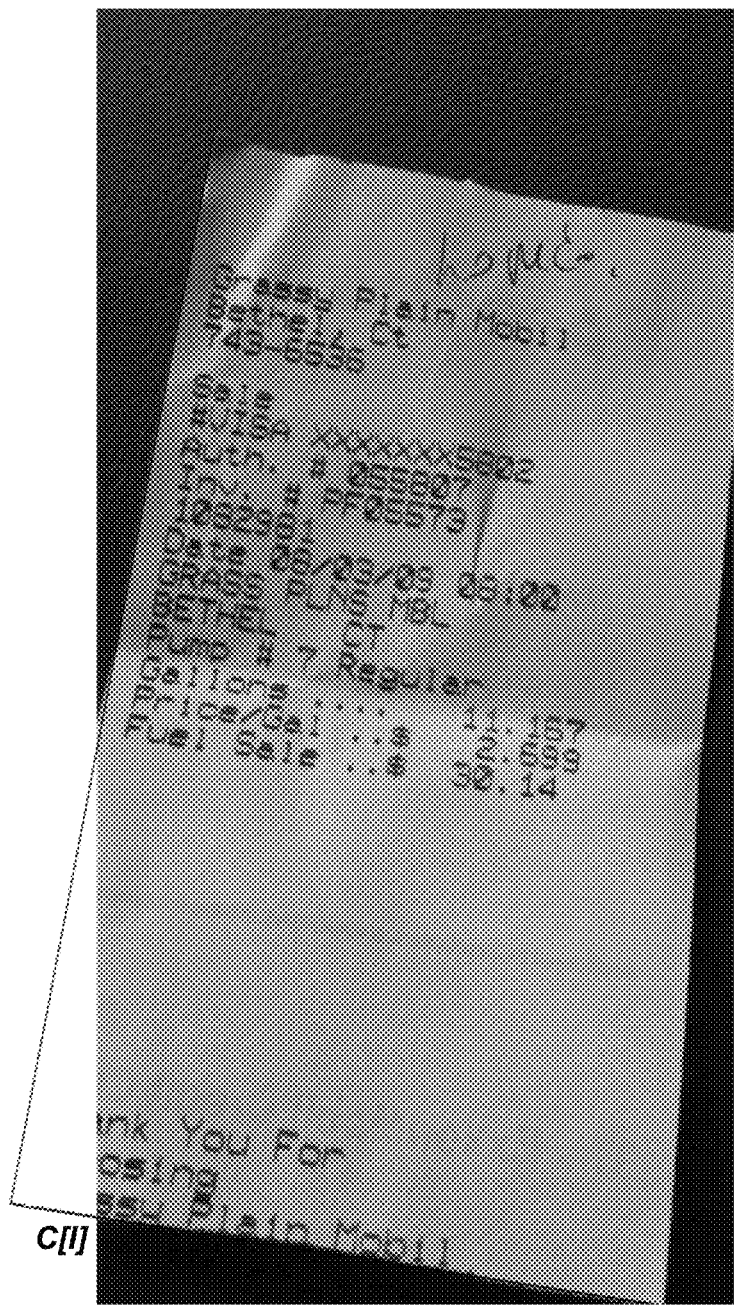
FIG. 11 is an example of a mobile image where the corner of the imaged document is cut off according to an embodiment.

Depending upon how carefully the user framed a document when capturing a mobile image, it is possible that one or more corners of the document can be cut off in the mobile document image. As a result, important information can be lost from the document. For example, if the lower left-hand corner of a check is cut off in the mobile image, a portion of the MICR-line might be cut off, resulting in incomplete MICR data recognition. FIG. 11 illustrates an example of a mobile document image that features a receipt where one of the corners has been cut off.

Figure 12:
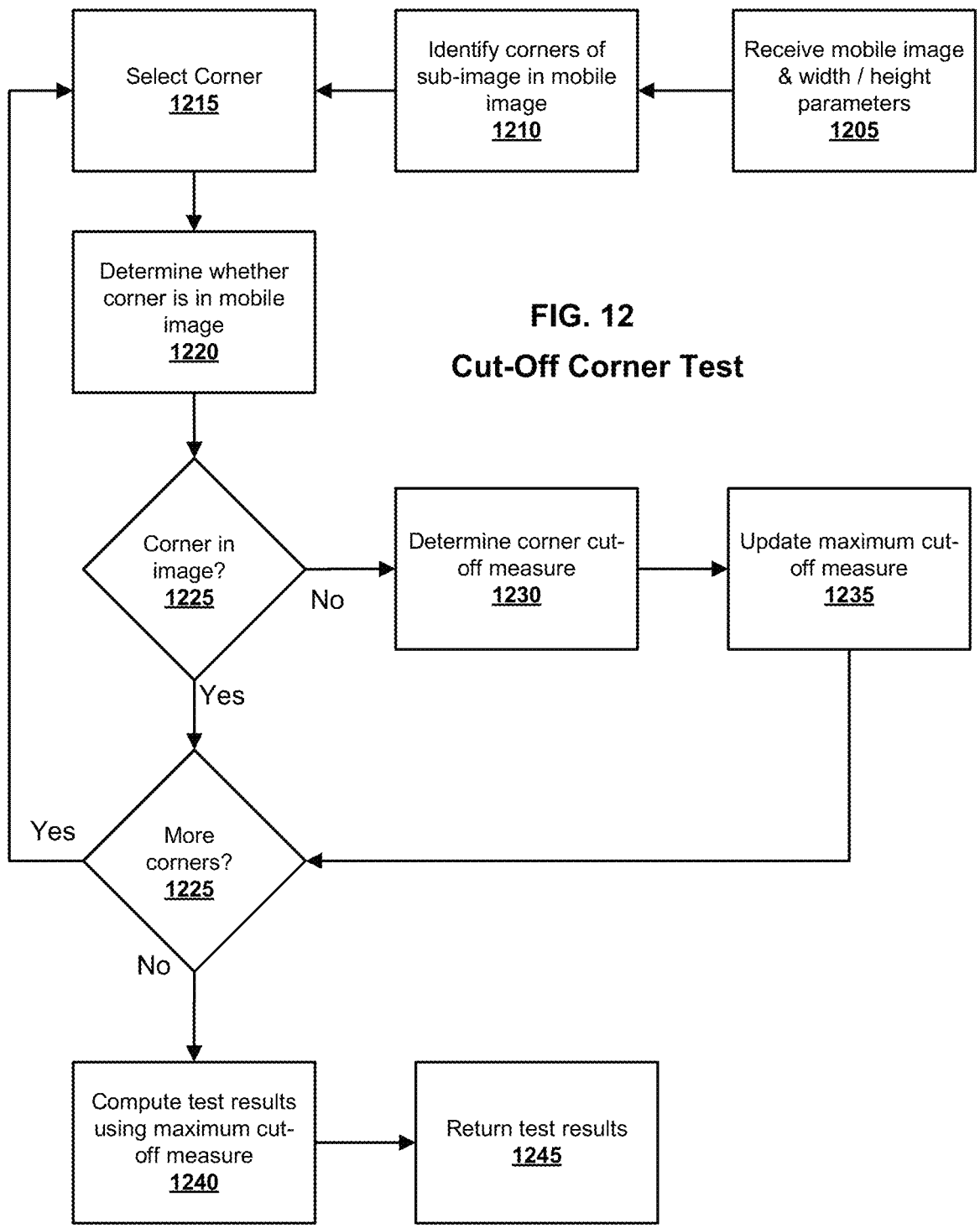
FIG. 12 is a method for testing whether one or more corners of a document in a mobile image have been cut off according to an embodiment.

FIG. 12 illustrates a Cut-Off Corner Test that can be used with embodiments of the MDIPE 100 for testing whether corners of a document in a document subimage have been cut off when the document was imaged. The mobile image including height and width parameters are received (step 1205). In an embodiment, the height and width of the mobile image can be determined by the preprocessing module 110. The corners of the document subimage are then identified in the mobile document image (step 1210). Various techniques can be used to identify the corners of the image, including the various techniques described above. In an embodiment, the preprocessing module 110 identifies the corners of the document subimage. As illustrated in FIG. 11, one or more of the corners of a document can be cut off. However, the preprocessing module 110 can be configured to determine what the location of the corner should have been had the document not been cut off using the edges of the document in the subimage. FIG. 11 illustrates how the preprocessing module 110 has estimated the location of the missing corner of the document by extending lines from the sides of the document out to the point where the lines intersect. The preprocessing module 110 can then provide the corners information for the document to the test execution module 130 to execute the Cut-Off Corner IQA Test. In an embodiment, test variables and the test results values to be returned by the test are set to default values: the test value V to be returned from the test is set to a default value of 1000, indicating that all of the corners of the document are within the mobile document image, and a maximum cut off variable (MaxCutOff) is set to zero indicating that no corner was cut off.

A corner of the document is selected (step 1220). In an embodiment, the four corners are received as an array of x and y coordinates C[I], where I is equal to the values 1-4 representing the four corners of the document.

A determination is made whether the selected corner of the document is within the mobile document image (step 1225). The x & y coordinates of the selected corner should be at or between the edges of the image. According to an embodiment, the determination whether a corner is within the mobile document image can be determined using the following criteria: (1) $C[I].x>0$ & $C[I].x<\text{Width}$, where Width=the width of the mobile document image and $C[I].x$=the x-coordinate of the selected corner; and (2) $C[I].y>0$ & $C[I].y<\text{Height}$, where Height=the height of the mobile document image and $C[I].y$=the y-coordinate of the selected corner.

If the selected corner fails to satisfy the criteria above, the corner is not within the mobile image and has been cut-off. A corner cut-off measurement is determined for the corner (step 1230). The corner cut-off measurement represents the relative distance to the edge of the mobile document image. According to an embodiment, the corner cut-off measurement can be determined using the following:

(1) Set H[I] and V[I] to zero, where H[I] represents the horizontal normalized cut-off measure and V[I] represents the vertical normalized cut-off measure.

(2) If $C[I].x<0$, then set $H[I]=-1000*C[I].x/\text{Width}$ (3) If $C[I].x>\text{Width}$, set $H[I]=1000*(C[I].x-\text{Width})/\text{Width}$, where Width is the width of the mobile image (4) If $C[I].y<0$, set $V[I]=-1000*C[I].y/\text{Height}$, where Height is the height of the mobile image (5) If $C[I].y>\text{Height}$, set $V[I]=1000*(C[I].y-\text{Height})/\text{Height}$ (6) Normalize H[I] and V[I] to fall within the 0-1000 range used by the mobile IQA tests by setting $H[I]=\min(1000, H[I])$ and $V[I]=\min(1000, V[I])$.

(7) Set $\text{CutOff}[I]=\min(H(I), V(I))$, which is the normalized cut-off measure of the corner. One can see that the CutOff[I] lies within [0-1000] range used by the mobile IQA tests and the value increases as the corner moves away from mobile image boundaries.

An overall maximum cut-off value is also updated using the normalized cut-off measure of the corner (step 1235). According to an embodiment, the following formula can be used to update the maximum cut-off value: MaxCutOff=max (MaxCutOff, CutOff[I]). Once the maximum cut-off value is determined, a determination is made whether more corners are to be tested (step 1225).

If the selected corner satisfies the criteria above, the corner is within the mobile document image and is not cut-off. A determination is then made whether there are additional corners to be tested (step 1225). If there are more corners to be processed, a next corner to be test is selected (step 1215). Otherwise, if there are no more corners to be tested, the test result value for the test is computing using the maximum test cut-off measurement. In an embodiment, the test result value V=1000−MaxCutOff One can see that V lies within [0-1000] range for the mobile IQA tests and is equal to 1000 when all the corners are inside the mobile image and decreases as one or more corner move outside of the mobile image.

The test result value is then returned (1245). As described above, the test result value is provided to the test execution module 130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. The user may simply need to retake the image with the document corners within the frame.

Cut-Side Test

Depending upon how carefully the user framed a document when capturing a mobile image, it is possible that one or more sides of the document can be cut off in the mobile document image. As a result, important information can be lost from the document. For example, if the bottom a check is cut off in the mobile image, the MICR-line might be cut off, rendering the image unusable for a Mobile Deposit application that uses the MICR information to electronically deposit checks.

Figure 13:
FIG. 13 is an example of a mobile image where the side of the imaged document is cut off according to an embodiment.

FIG. 13 illustrates an example of a mobile document image that features a receipt where one of the corners has been cut off. Unlike the Cut-Corner Test described above which can be configured to allow a document to pass if the amount of cut-off falls is small enough that the document image still receives a test score that meets or exceeds the threshold associated with the test, the Cut-Side Test is either pass or fail. If one or more sides of the document subimage are cut off in the mobile document image, the potential to lose critical information is too high, and mobile document is marked as failing.

Figure 14:
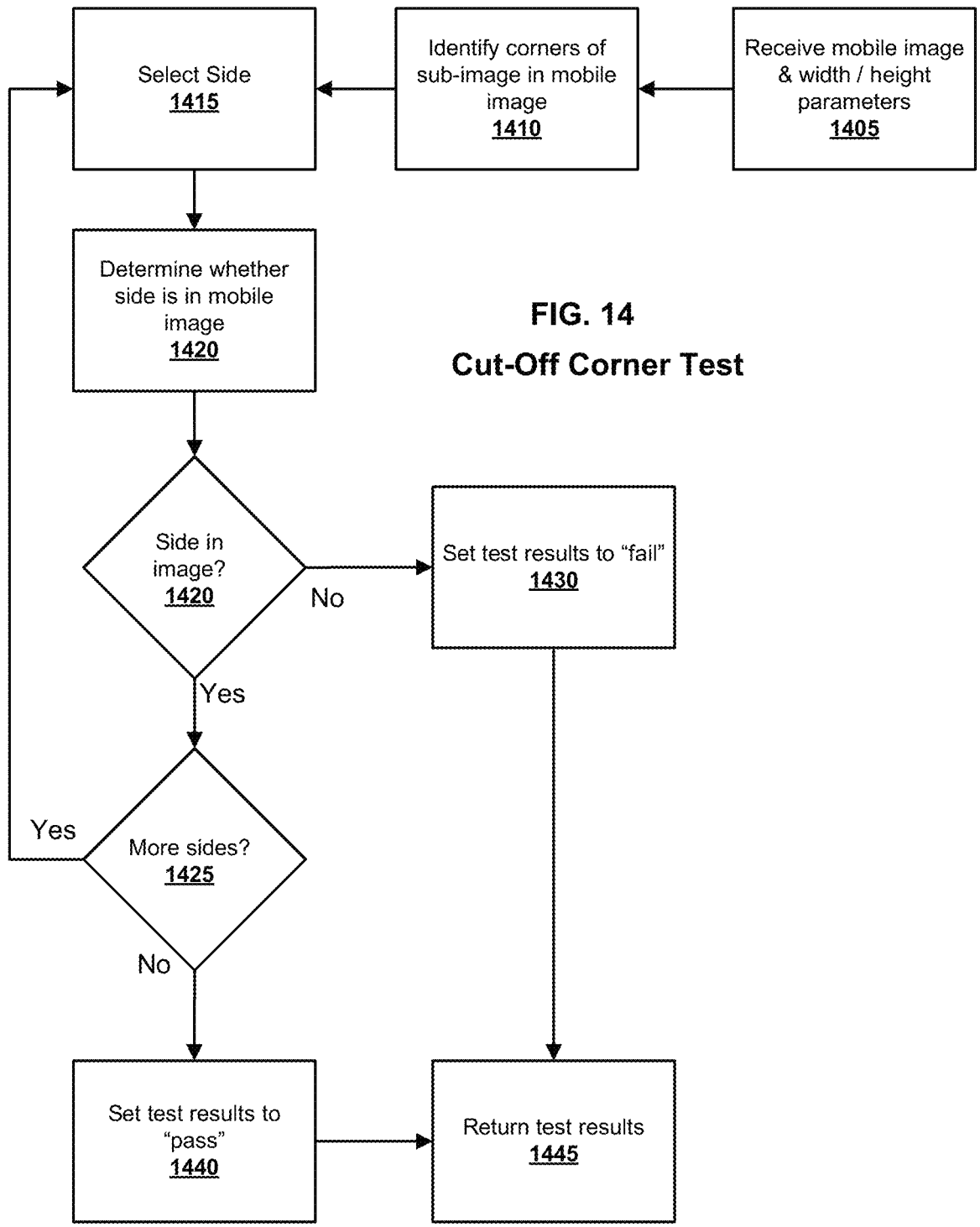
FIG. 14 is a method for testing whether a side of a document in a mobile image have been cut off according to an embodiment.

FIG. 14 is a flow diagram of a method for determining whether one or more sides of the document are cut off in the document subimage according to an embodiment. The mobile image is received (step 1405). In an embodiment, the height and width of the mobile image can be determined by the preprocessing module 110. The corners of the document subimage are then identified in the mobile document image (step 1410). Various techniques can be used to identify the corners of the image, including the various techniques described above. In an embodiment, the preprocessing module 110 identifies the corners of the document subimage.

A side of the document is selected (step 1420). In an embodiment, the four corners are received as an array of x and y coordinates C[I], where I is equal to the values 1-4 representing the four corners of the document.

A determination is made whether the selected corner of the document is within the mobile document image (step 1425). According to an embodiment, the document subimage has four side and each side S[I] includes two adjacent corners C1[I] and C2[I]. A side is deemed to be cut-off if the corners comprising the side are on the edge of the mobile image. In an embodiment, a side of the document is cut-off if any of the following criteria are met:

(1) C1[I].x=C2[I].x=0, where x=the x-coordinate of the corner (2) C1[I].x=C2[I].x=Width, where Width=the width of the mobile image (3) C1[I].y=C2[I].y=0, where y=the y-coordinate of the corner (4) C1[I].y=C2[I].y=Height, where Height=the height of the mobile image If the side does not fall within the mobile image, the test result value is set to zero indicating that the mobile image failed the test (step 1430), and the test results are returned (step 1445).

If the side falls within the mobile image, a determination is made whether there are more sides to be tested (step 1425). If there are more sides to be tested, an untested side is selected (step 1415). Otherwise, all of the sides were within the mobile image, so the test result value for the test is set to 1000 indicating the test passed (step 1440), and the test result value is returned (step 1445).

Warped Image Test

Figure 15:
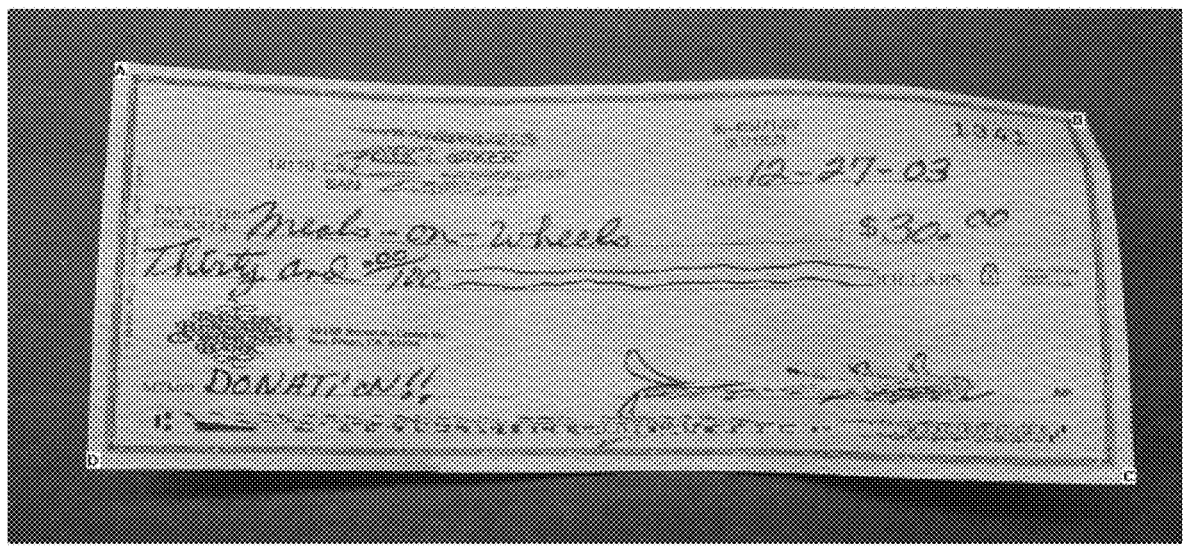
FIG. 15 is an example of a mobile image where the image of the document is warped according to an embodiment.

The warped image test identifies images where document is warped. FIG. 15 illustrates an example of a mobile document image where the document is warped. In some embodiments, the preprocessing module 110 can be configured to include de-warping functionality for correcting warped images. However, in some embodiments, a Warped Image Test is provided to detect and reject warped images. One solution for correcting warped images is to instruct the user to retake the image after flattening the hardcopy of the document being imaged.

Figure 16:
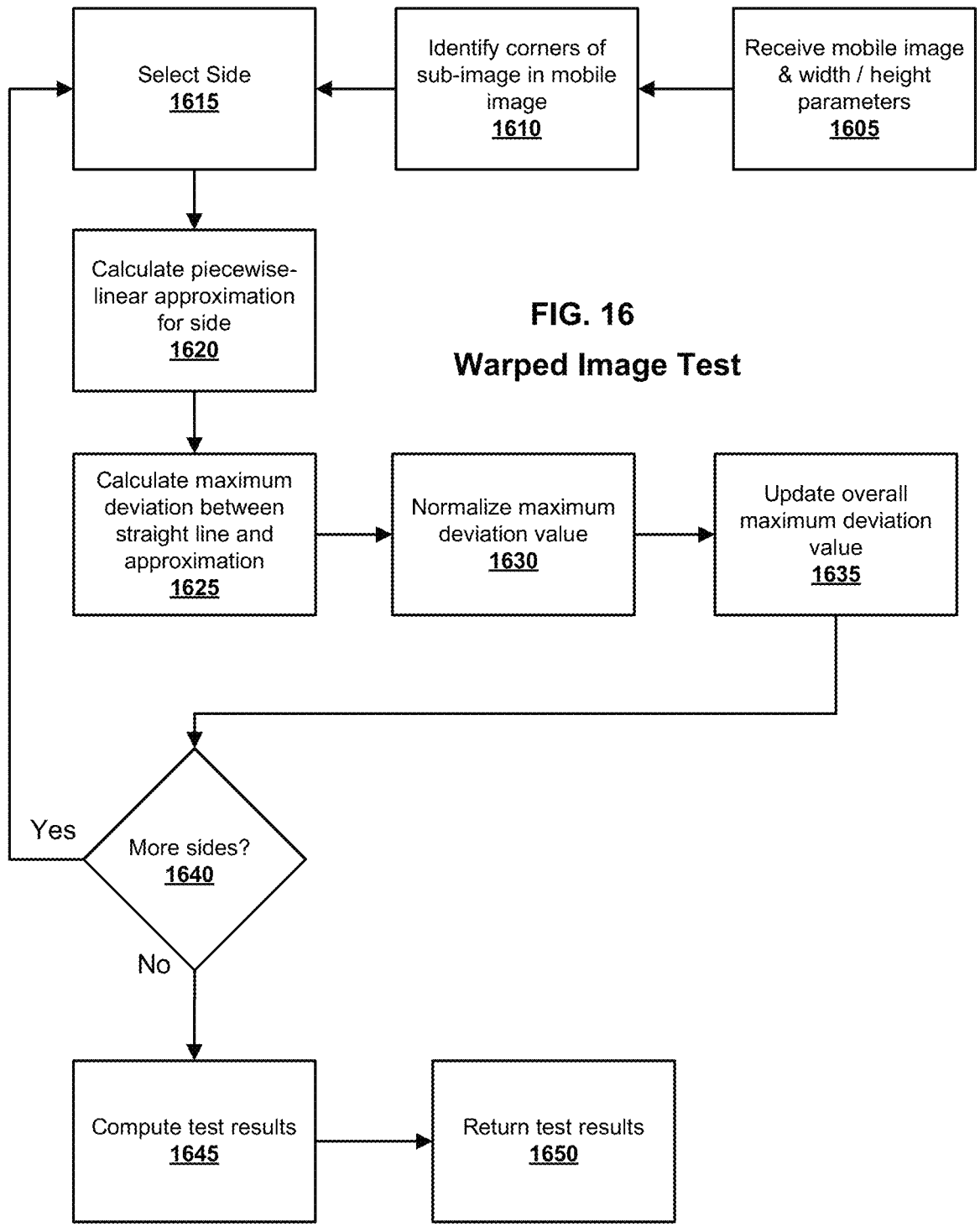
FIG. 16 is an example method for testing whether a document in a mobile image is warped according to an embodiment.

FIG. 16 is a flow diagram of a method for identifying a warped image and for scoring the image based on how badly the document subimage is warped according to an embodiment. A warped image test score value is returned by the test, and this value can be compared with a threshold value by the test execution module 130 to determine whether the image warping is excessive.

The mobile image is received (step 1605). In an embodiment, the height and width of the mobile image can be determined by the preprocessing module 110. The corners of the document subimage are then identified in the mobile document image (step 1610). Various techniques can be used to identify the corners of the image, including the various techniques described above. In an embodiment, the preprocessing module 110 identifies the corners of the document subimage.

A side of the document is selected (step 1615). According to an embodiment, the document subimage has four side and each side S[I] includes two adjacent corners C1[I] and C2[I].

A piecewise linear approximation is built for the selected side (step 1620). According to an embodiment, the piecewise-linear approximation is built along the selected side by following the straight line connecting the adjacent corners C1[I] and C2[I] and detecting position of the highest contrast starting from any position within [C1[I], C2[I]] segment and moving in orthogonal direction.

After the piecewise linear approximation is built along the [C1[I], C2[I]] segment, the [C1[I], C2[I]] segment is walked to compute the deviation between the straight line and the approximation determined using piecewise linear approximation (step 1625). Each time the deviation is calculated, a maximum deviation value (MaxDev) is updated to reflect the maximum deviation value identified during the walk along the [C1[I], C2[I]] segment.

The maximum deviation value for the side is then normalized to generate a normalized maximized deviation value for the selected size of the document image (step 1630). According to an embodiment, the normalized value can be determined using the following formula:

NormMaxDev[*I*]=1000*MaxDev[*I*]/Dim, where Dim is the mobile image dimension perpendicular to side S[*I*].

An overall normalized maximum deviation value is then updated using the normalized deviation value calculated for the side. According to an embodiment, the overall maximum deviation can be determined using the formula:

OverallMaxDeviation=max(OverallMaxDeviation, NormMaxDev[*I*])

A determination is then made whether there are anymore sides to be tested (step 1640). If there are more sides to be tested, an untested side is selected for testing (step 1615). Otherwise, if no untested sides remain, the warped image test value is computed. According to an embodiment, the warped image test value can be determined using the following formula:

*V*=1000−OverallMaxDeviation

One can see that V lies within [0-1000] range used by the image IQA system and is equal to 1000 when the sides S[I] are straight line segments (and therefore no warp is present). The computed test result is then returned (step 1650). As described above, the test result value is provided to the test execution module 130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image after flattening out the hardcopy of the document being imaged in order to reduce warping.

Image Size Test

The Image Size Test detects the actual size and the effective resolution of the document subimage. The perspective transformation that can be performed by embodiments of the preprocessing module 110 allows for a quadrangle of any size to be transformed into a rectangle to correct for view distortion. However, a small subimage can cause loss of detail needed to process the subimage.

Figure 17:
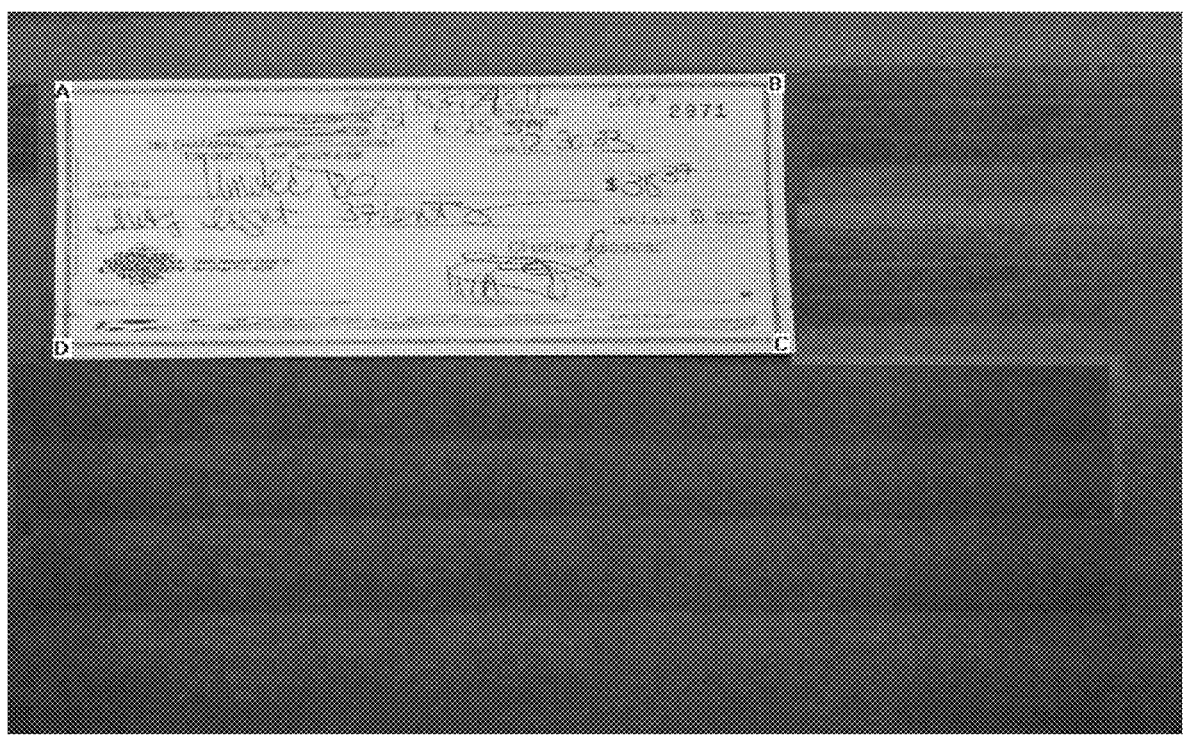
FIG. 17 is an example of an mobile image where document subimage captured in the mobile image is small compared to the overall size of the mobile document image according to an embodiment.

FIG. 17 illustrates an example of a document subimage within a mobile document image that is relatively small. Small size of the subimage can cause the loss of important foreground information. This effect is similar to digital zooming in a digital camera where image of an object becomes larger, but the image quality of object can significantly degrade due to loss of resolution and important details can be lost.

Figure 18:
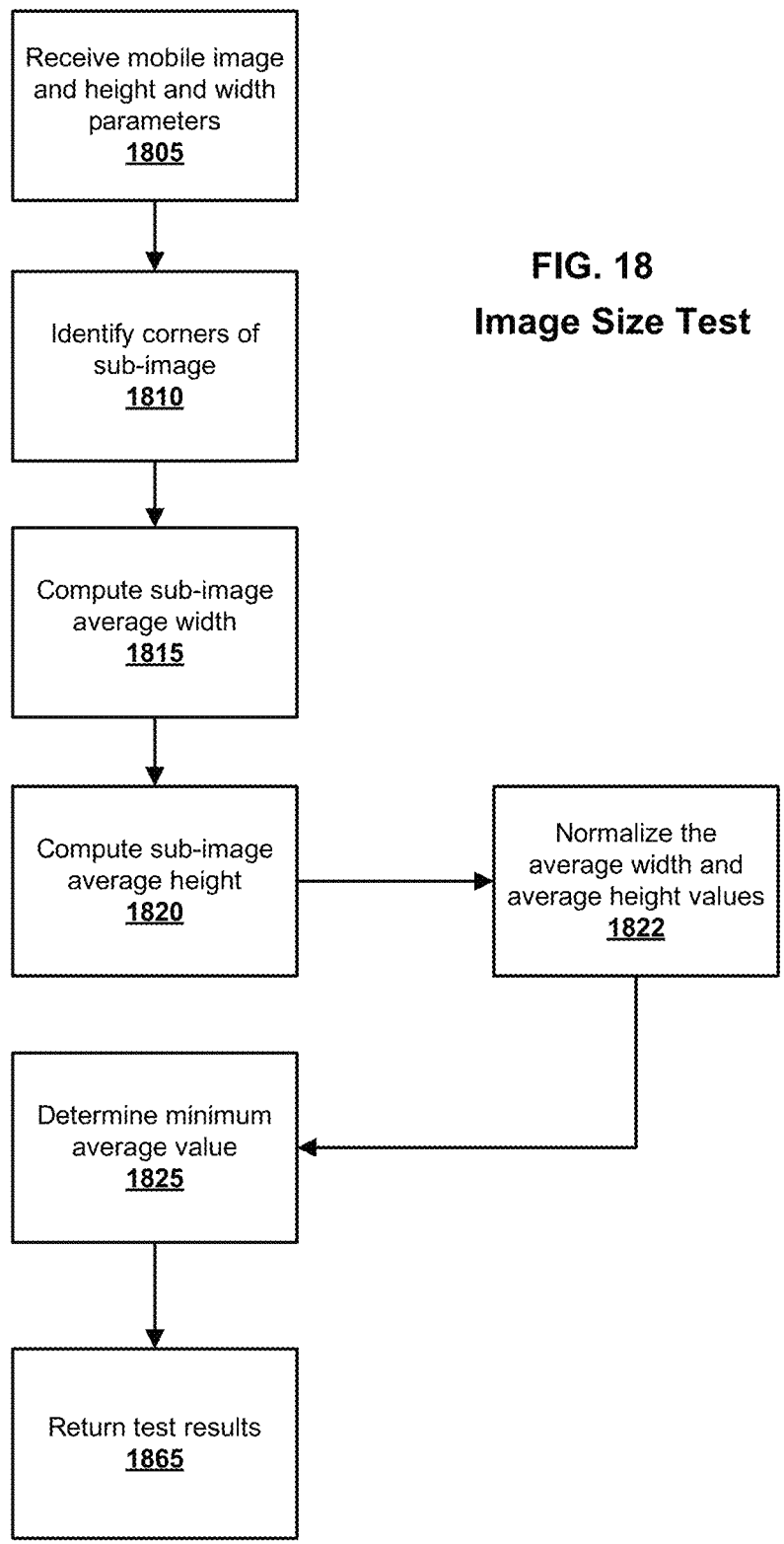
FIG. 18 is a method for testing whether the size of the image captured in a mobile image is too small.

FIG. 18 is a flow diagram of a process that for performing an Image Size Test on a subimage according to an embodiment. The mobile image is received (step 1805). In an embodiment, the height and width of the mobile image can be determined by the preprocessing module 110. The corners of the document subimage are then identified in the mobile document image (step 1810). Various techniques can be used to identify the corners of the image, including the various techniques described above. In an embodiment, the preprocessing module 110 identifies the corners of the document subimage. In the method the corners of the subimage are denoted as follows: A represents the top-left corner, B represents the top-right corner of the subimage, C represents the bottom-right corner of the subimage, and D represents the bottom-left corner of the subimage.

A subimage average width is computed (step 1815). In an embodiment, the subimage average width can be calculated using the following formula:

Subimage average width as AveWidth=(|*AB*|+|*CD*|)/2, where |*PQ*| represents the Euclidian distance from point *P* to point *Q*.

A subimage average height is computed (step 1820). In an embodiment, the subimage average height can be calculated using the following formula:

AveHeight=(|*BC*|+|*DA*|)/2

The average width and average height values are then normalized to fit the 0-1000 range used by the mobile IQA tests (step 1822). The following formulas can be used determine the normalize the average width and height:

NormAveWidth=1000*AveWidth/Width

NormAveHeight=1000*AveWidth/Height

A minimum average value is then determined for the subimage (step 1825). According to an embodiment, the minimum average value is the smaller of the normalized average width and the normalized average height values. The minimum average value falls within the 0-1000 range used by the mobile IQA tests. The minimum average value will equal 1000 if the document subimage fills the entire mobile image.

The minimum average value is returned as the test result (step 1865). As described above, the test result value is provided to the test execution module 130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image by positioning the camera closer to the document.

MICR-Line Test

The MICR-line Test is used to determine whether a high quality image of a check front has been captured using the mobile device according to an embodiment. The MICR-line Test can be used in conjunction with a Mobile Deposit application to ensure that images of checks captures for processing with the Mobile Deposit information are of a high enough quality to be processed so that the check can be electronically deposited. Furthermore, if a mobile image fails the MICR-line Test, the failure may be indicative of incorrect subimage detections and/or poor overall quality of the mobile image, and such an image should be rejected anyway.

Figure 19:
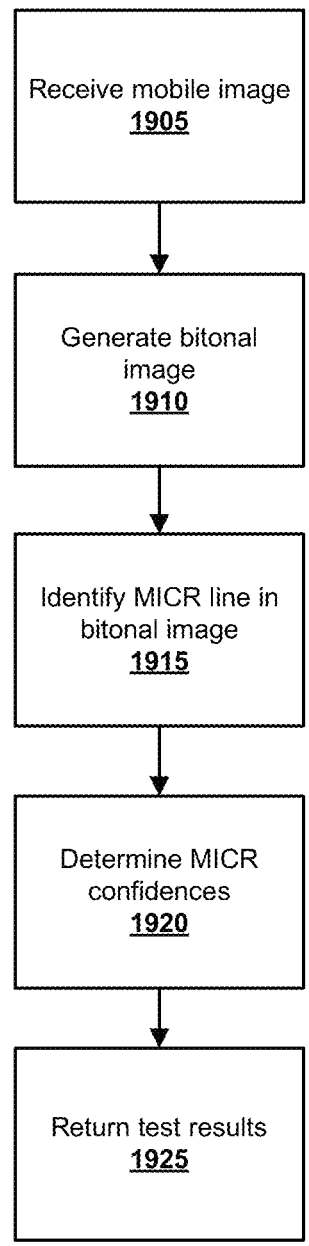
FIG. 19 is a method for testing whether a MICR line of the document captured in a mobile image is of high enough quality according to an embodiment.

FIG. 19 is a flow chart of a method for executing a MICR-line Test according to an embodiment. A mobile image is received (step 1905) and a bitonal image is generated from the mobile image (step 1910). In an embodiment, preprocessor 110 extracts the document subimage from the mobile image as described above, including preprocessing such as geometric correction. The extracted subimage can then be converted to a bitonal snippet by the preprocessor 110. The MICR line is then identified in the bitonal snippet (step 1915). According to an embodiment, a MICR recognition engine is then applied to identify the MICR-line and to compute character-level and overall confidence values for the image. These confidences can then be normalized to the 0-1000 scale used by the mobile IQA tests where 1000 means high quality and 0 means poor MICR quality. The confidence level is then returned (step 1925). As described above, the test result value is provided to the test execution module 130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may simply need to retake the image to adjust for geometrical or other factors, such as poor lighting or a shadowed document. In some instances, the user may not be able to correct the errors. For example, if the MICR line on the document is damaged or incomplete and the document will continue to fail the test even if the image were retaken.

Aspect Ratio Test

The Aspect Ratio Test compares the aspect ratios of images that are purported to be of the front and back of check to determine whether the user has captured images of the front and back of the same check according to an embodiment. According to other embodiments, the Aspect Ratio Test could be applied to other types two-sided or multi-page documents to determine whether images purported to be of different pages of the document have the same aspect ratio.

Figure 20:
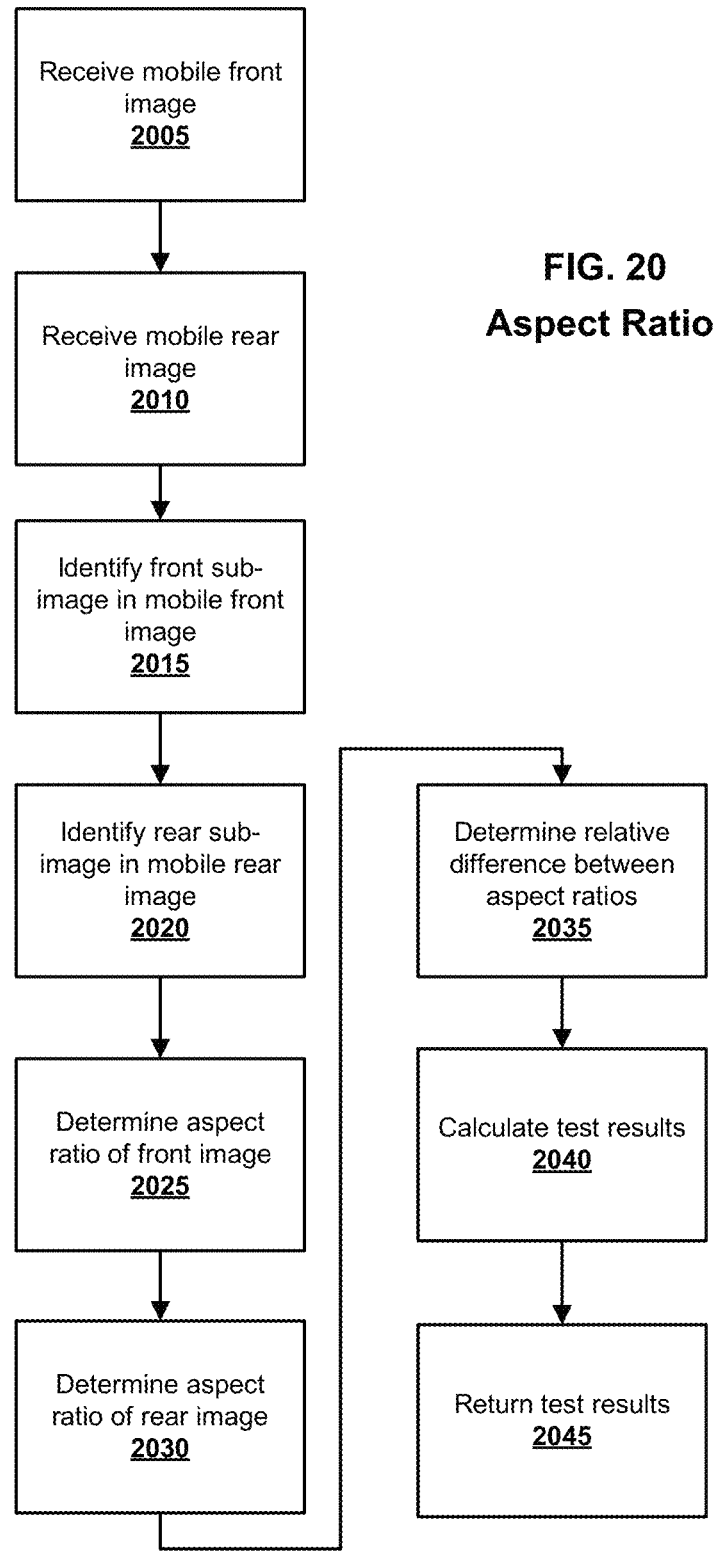
FIG. 20 is a method for testing the aspect ratios of the front and back images of a check to test whether the images are of the same check according to an embodiment.
Figure 21:
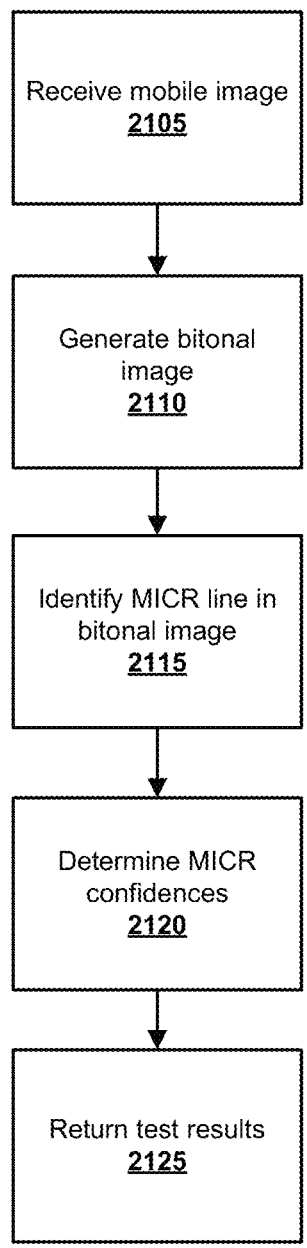
FIG. 21 is a method for testing whether the image of the front of the check has been marked as an image of the back of the check according to an embodiment.

FIG. 20 illustrates a method for executing an Aspect Ratio Test according to an embodiment. In the embodiment illustrated in FIG. 20, the test is directed to determining whether the images purported to be of the front and back side of a check have the same aspect ratio. However, the method could also be used to test whether two images purported to be from a multi-page or multi-sided document have the same aspect ratio.

A front mobile image is received (step 2005) and a rear mobile image is received (step 2010). The front mobile image is supposed to be of the front side of a check while the rear mobile image is supposed to be the back side of a check. If the images are really of opposite sides of the same check, the aspect ratio of the document subimages should match. The preprocessing module 110 can process the front mobile image to generate a front-side snippet (step 2015) and can also process the back side image to generate a back-side snippet (step 2020).

The aspect ratio of the front-side snippet is then calculated (step 2025). In an embodiment, the AspectRatioFront=Width/Height, where Width=the width of the front-side snippet and Height=the height of the front-side snippet.

The aspect ratio of the back-side snippet is then calculated (step 2030). In an embodiment, the AspectRatioBack=Width/Height, where Width=the width of the back-side snippet and Height=the height of the back-side snippet.

The relative difference between the aspect ratios of the front and rear snippets is then determined (step 2035). According to an embodiment, the relative difference between the aspect ratios can be determined using the following formula:

$$RelDiff=1000*abs(AspectRatioFront-AspectRatioBack)/max(AspectRatioFront,AspectRatioBack)$$

A test result value is then calculated based on the relative difference between the aspect ratios (step 2040). According to an embodiment, the test value V can be computed using the formula V=1000−RelDiff.

The test results are then returned (step 2045). As described above, the test result value is provided to the test execution module 130 where the test result value can be compared to a threshold value associated with the test. If the test result value falls below the threshold associated with the test, detailed test result messages can be retrieved from the test result message data store 136 and provided to the user to indicate why the test failed and what might be done to remedy the test. For example, the user may have mixed up the front and back images from two different checks having two different aspect ratios. If the document images fails the test, the user can be prompted to verify that the images purported to be the front and back of the same check really are from the same check.

Front-as-Rear Test

The Front-as-Rear Test can be used to determine whether an image that is purported to be the back of a check is actually an image of the front of the check according to an embodiment. The Front-as-Rear Test is a check specific Boolean test. The test returns a value of 0 if an image fails the test and a value of 1000 if an image passes the test. If an MICR-line is identified on what is purported to be an image of the back of the check, the image will fail the test and generate a test message that indicates that the images of the check have been rejected because an image of the front of the check was mistakenly passed as an image of the rear of the check.

An image of the rear of the check is received (step 2105) and the image is converted to a bitonal snippet by preprocessor 110 of the MDIPE 100 (step 2010). A MICR recognition engine is then applied to identify a MICR-line in the bitonal snippet. The results from the MICR recognition engine can then be normalized to the 0-1000 scale used by the mobile IQA tests, and the normalized value compared to a threshold value associated with the test. According to an embodiment, the test threshold can be provided as a parameter to the test along with the with mobile document image to be tested. According to an embodiment, the threshold used for this test is lower than the threshold used in the MICR-line Test described above.

If the normalized test result equals or exceeds the threshold, then the image includes an MICR-line and the test is marked as failed (test result value=0), because a MICR line was identified in what was purported to be an image of the back of the check. If the normalized test result is less than the threshold, the image did not include a MICR line and the test is marked as passed (test result value=1000). The test results value is then returned (step 2125).

Figure 22:
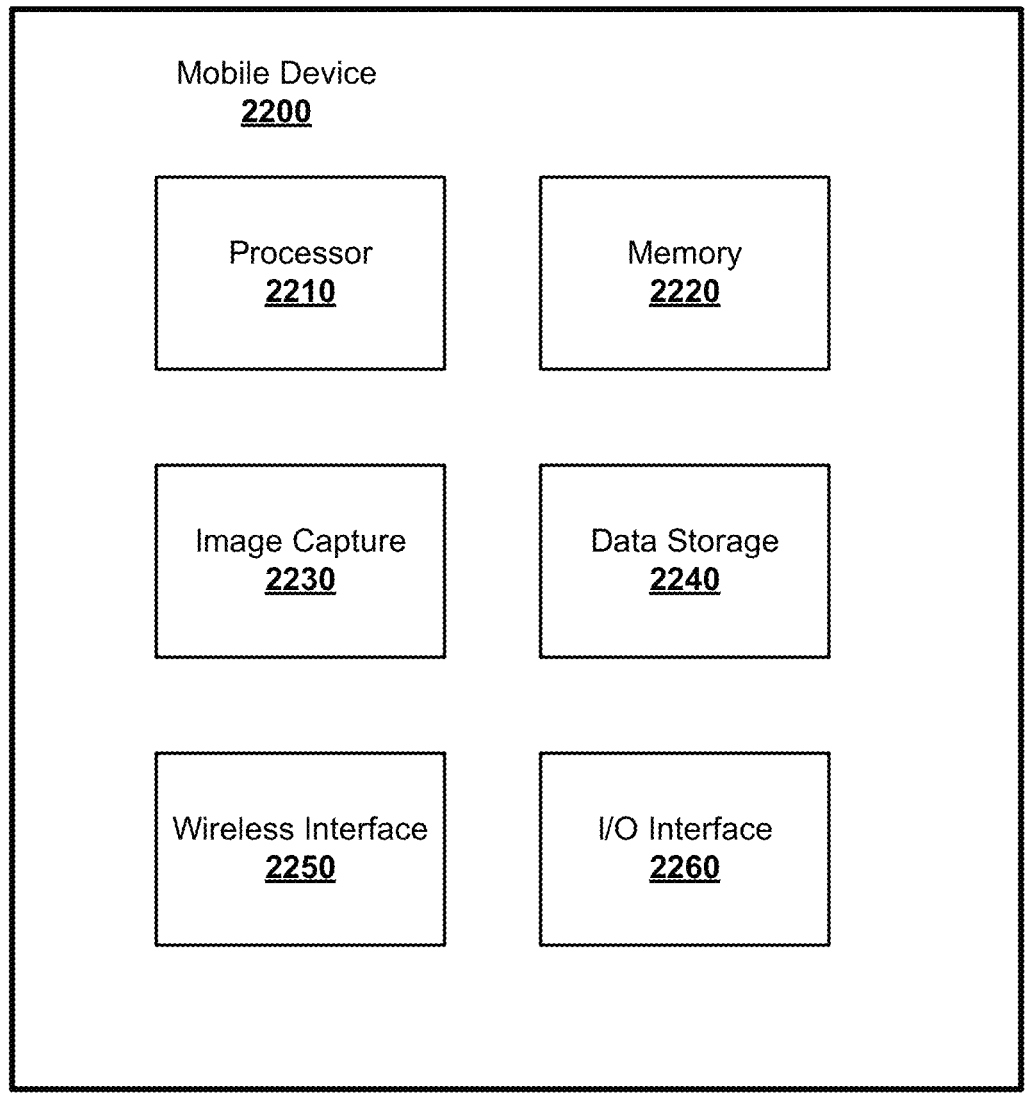
FIG. 22 is a block diagram of a computing device on which the mobile image quality assurance system described above can be implemented according to an embodiment.

FIG. 22 is an exemplary embodiment of a mobile device 2200 than can be used to implement the mobile IQA system according to an embodiment. Mobile device 2200 includes a processor 2210. The processor 2210 can be a microprocessor or the like that is configurable to execute program instructions stored in the memory 2220 and/or the data storage 2240. The memory 2220 is a computer-readable memory that can be used to store data and or computer program instructions that can be executed by the processor 2210. According to an embodiment, the memory 2220 can comprise volatile memory, such as RAM and/or persistent memory, such as flash memory. The data storage 2240 is a computer readable storage medium that can be used to store data and or computer program instructions. The data storage 2240 can be a hard drive, flash memory, a SD card, and/or other types of data storage.

The mobile device 2200 also includes an image capture component 2230, such as a digital camera. According to some embodiments, the mobile device 2200 is a mobile phone, a smart phone, or a PDA, and the image capture component 2230 is an integrated digital camera that can include various features, such as auto-focus and/or optical and/or digital zoom. In an embodiment, the image capture component 2230 can capture image data and store the data in memory 2220 and/or data storage 2240 of the mobile device 2200.

Wireless interface 2250 of the mobile device can be used to send and/or receive data across a wireless network. For example, the wireless network can be a wireless LAN, a mobile phone carrier's network, and/or other types of wireless network.

I/O interface 2260 can also be included in the mobile device to allow the mobile device to exchange data with peripherals such as a personal computer system. For example, the mobile device might include a USB interface that allows the mobile to be connected to USB port of a personal computer system in order to transfers information such as contact information to and from the mobile device and/or to transfer image data captured by the image capture component 2230 to the personal computer system.

Reflection Test

In one embodiment, a reflection test may be performed on the image to determine whether reflection exists and whether the reflection distorts the document in the image to the point that it needs to be re-taken. The goal of a reflection test is to identify mobile images with significant reflection (glare). Depending on a mobile application's preferences, such images may be rejected back to the user so that he/she takes the picture of the document again. The frequency of images with reflection varies significantly between different document types/applications. For example, in one analysis, about 10-15% of driver's license images have reflection of different severity, whereas less than 1% of check or payment coupons images have significant reflections. This consideration makes it more important to detect and measure reflection for applications dealing with driver's licenses or laminated identification cards than for applications dealing with payment coupons. Images with reflection are often unusable. In one embodiment, after correctly detecting that the image has a reflection it can be re-taken and then successfully re-submitted.

Figure 23:
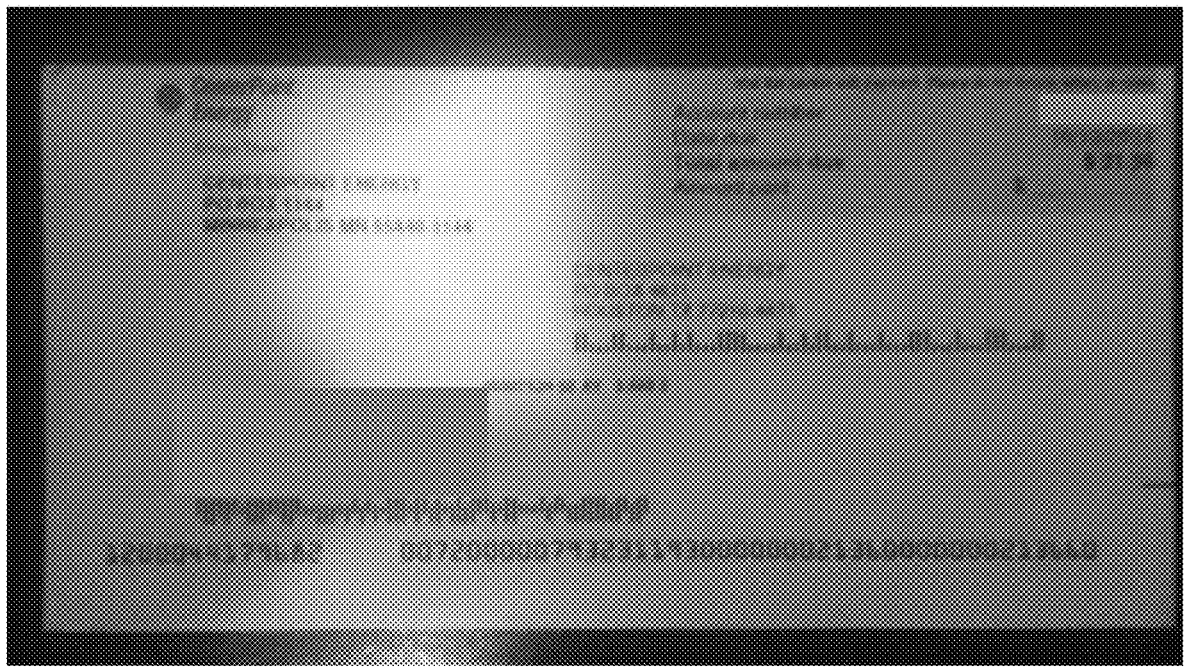
FIG. 23 is an image of a document with a reflection, according to an embodiment.
Figure 24:
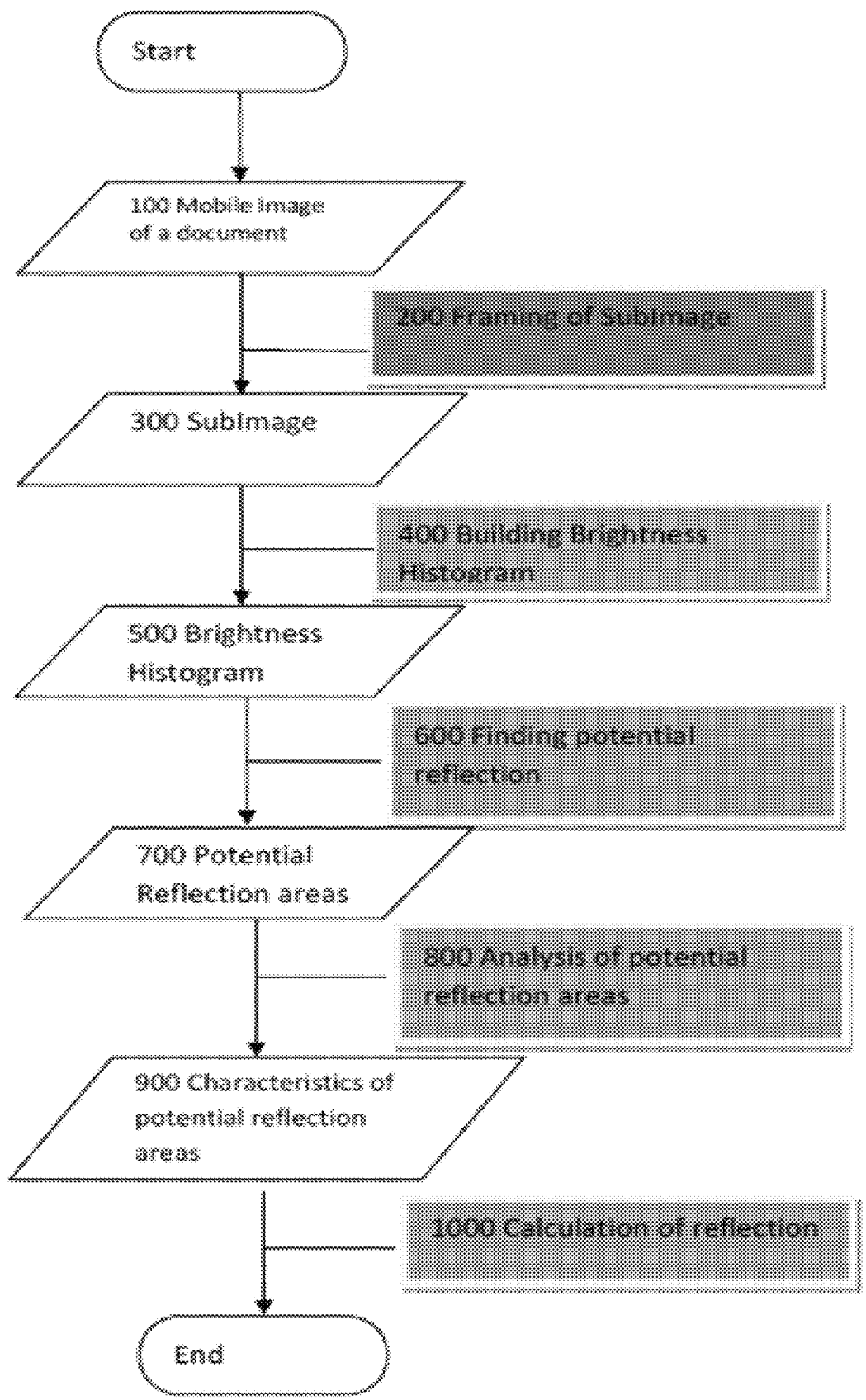
FIG. 24 is a flowchart illustrating a test for determining the reflectivity of the image, according to an embodiment.

In one embodiment, a presence of reflection is measured by examining bright areas in a SubImage (the part of the mobile image occupied by the document), taking into account their size, color, position and shape. FIG. 23 shows a mobile image with reflection, and FIG. 24 is a flowchart illustrating one embodiment of identifying and scoring the reflection in the mobile image.

In a first step 100, the mobile image of the document is captured and received. The mobile image may be captured by a mobile device such as a smartphone or tablet, or a wearable electronic device such as a watch, glasses, necklace or bracelet configured with an image capture device. The processing steps which follow may be carried out on the mobile device or on a remote server. In a second step 200, a document snippet (or SubImage) is detected in order to identify the part of the mobile image occupied by the document. This step may also be referred to as auto-framing. The SubImage may then be converted to grayscale in step 300.

In step 400, a brightness histogram is built. The brightness histogram may be represented by the relationship BH[g], where $0<=g<=255$–grayscale values, and BH[g] is the number of pixels in 300 with grayscale value of g. The resulting brightness histogram is output in step 500. In step 600, the brightness histogram is analyzed for possible reflection. For example, one or more local maximum in the "bright" area [200-255] must be present for the reflection to exist. If all local maxima are insignificant, no reflection was found, setting the score to 1000 and terminating the process. The "significance" may be set and adjusted depending on the type of document, type of device and other parameters, and may be defined experimentally. In step 700, the potential reflection areas are identified, and in step 800, the potential reflection areas are analyzed. In one embodiment, the analysis includes calculating parameters of the area. Assuming we found N areas in 700, for every area i, $1<=i<=N$ calculate 4 parameters:

C[i]—Average brightness

M[i]—The first moment of $i^{th}$ area (average of x- and y-coordinates for all pixels included into the area). The first moments shoe how far the area's shape is from a circle P[i]—Position, reflects how far the area is from the middle of the image S[i]—Size of the area Once the parameters are identified, in step 900 the values are computed and compared in order to determine the overall characteristics of the potential reflective areas.

In step 1000, the characteristics determined in step 900 are used to evaluate a reflection score. In one embodiment, the reflection score R[i] may be represented by the formula:

$$R[i]=a_0+a_1*C[i]+a_2*M[i]+a_3*P[i]+a_4*S[i]$$

The coefficients $a_k$ (k=0, 1, 2, 3, 4) have been established experimentally while solving minimal error optimization problem on a given set of "positive" and "negative" samples. Next, the coefficients are normalized to be the reflection value in a range 0 (severe reflection)-1000 (no reflection). A minimum value is returned as an overall Reflection Score.

As with the other tests described above, the acceptable Reflection Score may be adjusted depending on the type of application, device or use for the document, and the value may also be determined experimentally.

Busy Background Test

Figure 25:
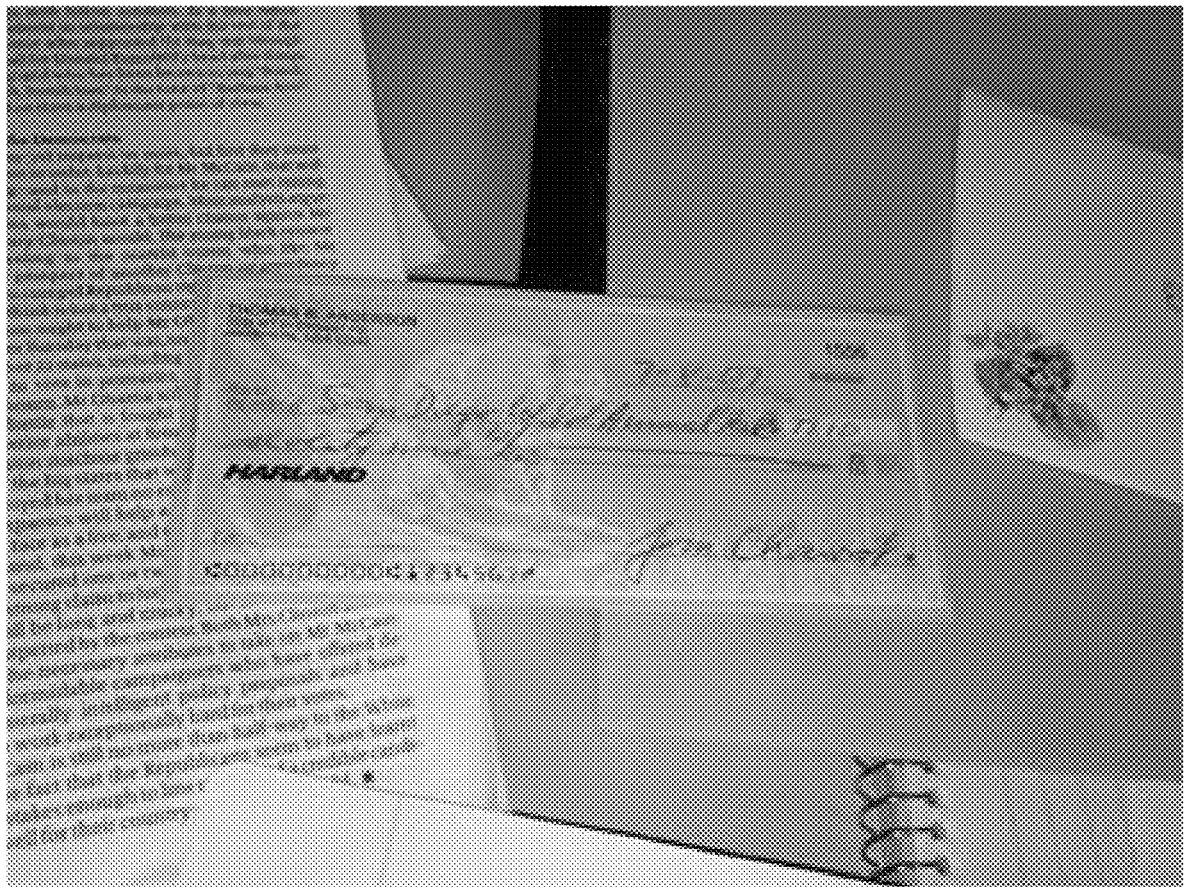
FIG. 25 is an image with a busy background surrounding a document, according to an embodiment.

The busy background test assures that the background surrounding the document within the mobile image is plain (monochrome). The reason why this test is important is that on non-monochrome (busy) backgrounds the likelihood of incorrect framing increases significantly compared to monochrome backgrounds. The presence of a busy background is measured by examining "background" lines, built using found edge points in the mobile image, as illustrated in the flowchart in FIG. 26. FIG. 25 shows a mobile image with a busy background.

Figure 26:
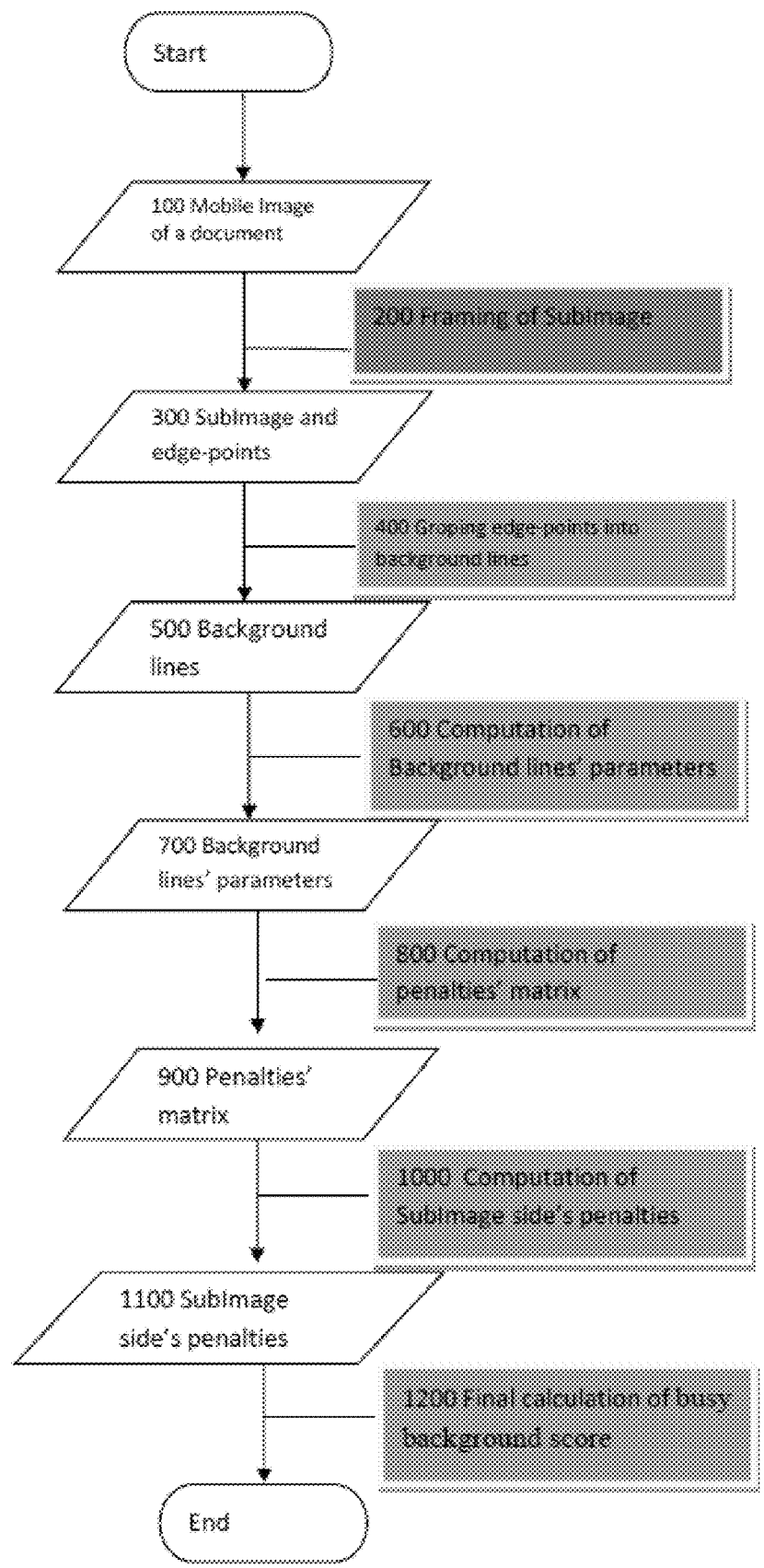
FIG. 26 is a flowchart illustrating a test for measuring the busy background, according to an embodiment.

As shown in the flowchart in FIG. 26, in one embodiment, a mobile image of a document is submitted in step 100, and auto-framing of the document snippet occurs in step 200 to identify the SubImage. In step 300, the results of auto-framing, including all found edge-points and SubImage sides is output.

In step 400, group edge points are converted into geometrical lines, and in step 500, geometrical lines located outside of the SubImage are detected and identified as "background" lines. In step 600, for each "background" line b, we compute the following parameters:

Votes[b]—the number of edge points included.

Contrast[b]—the line's overall contrast (medium gradient value of all included edge points)

As indicated above, b is an index of a "background" line, $1<=b<=B$, where B is the total number of "background" lines. In step 700, Votes[b] and Contrast[b] values computed in 600 are output; $1<=b<=B$, where B is the total number of "background" lines.

In step 800, the computation of a penalties' matrix is performed. For each "background" line b in step 600 and for each line s included into SubImage 300, we calculate penalty Penalty(s, b) to reflect the likelihood of confusion between the "background" line and SubImage's side as follows:

(a) If the direction of background line b is different form the direction of the "side" s, then Penalty(s, b)=0

(b) If the direction of background line b is identical to the direction of the "side" line s and Votes[b]*3>Votes[s] && Contrast[b]*3>Contrast[s], then Penalty(s, b)=Votes[b]*3/Votes[s]+Contrast[b]*3/Contrast[s].

(c) Otherwise, Penalty(s, b)=0

In step 900, the Penalties' matrix is output from the values of penalties Penalty(s, b) calculated in 800, where s is an index of the Subimage's side ($1<=s<=4$) and b is the index of the "background" line ($1<=b<=B$).

In step 1000, a computation of SubImage side's penalties is performed. An overall penalty for the SubImage's side s ($1<=s<=4$) is computed as the sum of Penalty(s, b) over all "background" lines, as follows:

Penalty(s)=Penalty(s,1)+Penalty(s,2)+ . . . +Penalty(s,B), for each"background" line $b(1<=b<=B)$.

In one embodiment, we limit Penalty (s) by 250, so that the final value computed below is within 0 and 1000:

Penalty(s)=min(250,Penalty(s))

In step 1100, the values of Penalty (s) ($1<=s<=4$) computed in 1000 is output as the SubImage side's penalties.

Finally, in step 1200, using 1100, the busy background score is calculated as:

Score=1000−(Penalty(1)+Penalty(2)+Penalty(3)+Penalty(4))

Due to 1000, $0<=Score<=1000$. One can see that if there is no "background" lines (B=0) or all found "background" lines have either low contrast Contrast(b) or low number of edges Votes(b), each penalty Penalty(s) is 0 and the Score is equal to 1000.

Low Contrast Background Test

Figure 27:
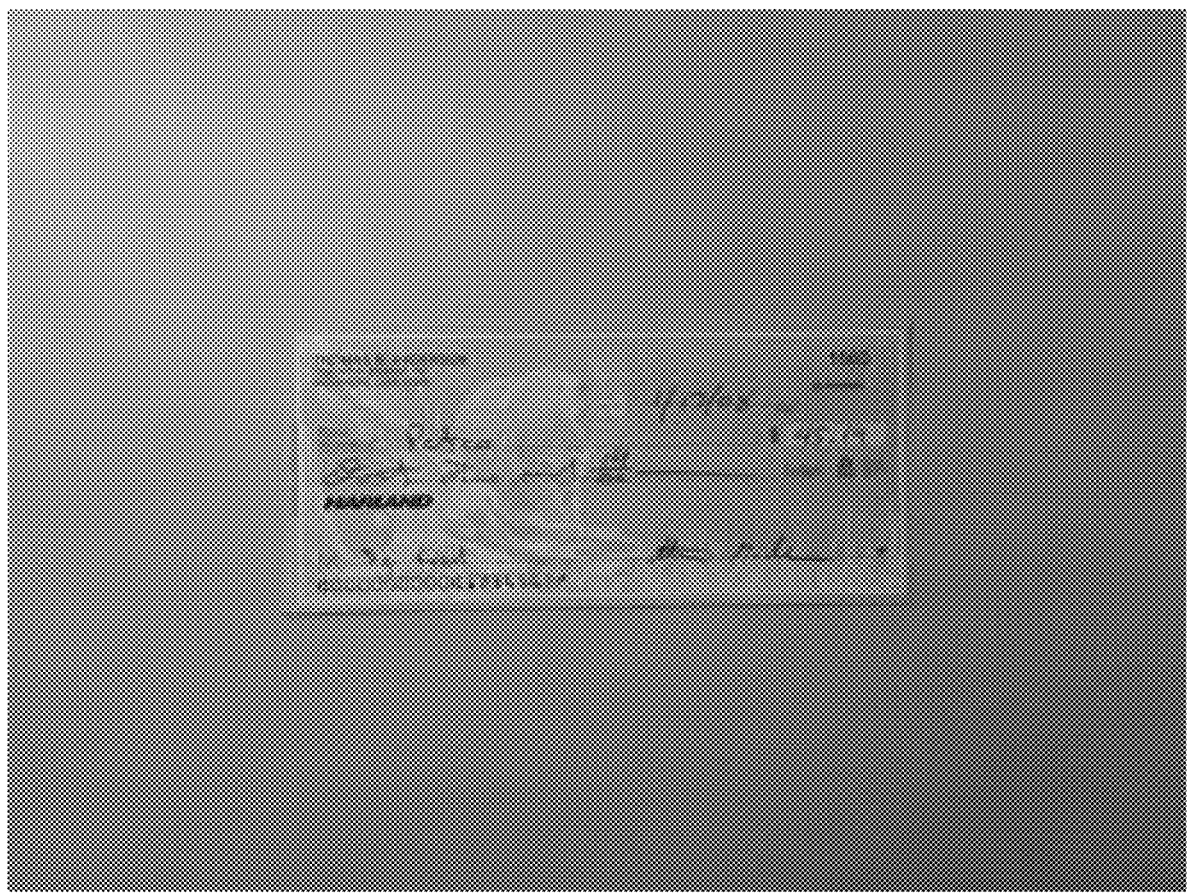
FIG. 27 is an image with a low contrast background, according to an embodiment.

The low contrast background test assures that the image background has a high contrast compared to the SubImage. The importance of this test is caused by the fact that auto-framing (and resulting SubImage) is much likelier incorrect when the background contrast is low. FIG. 27 shows a mobile image with a low contrast background.

Figure 28:
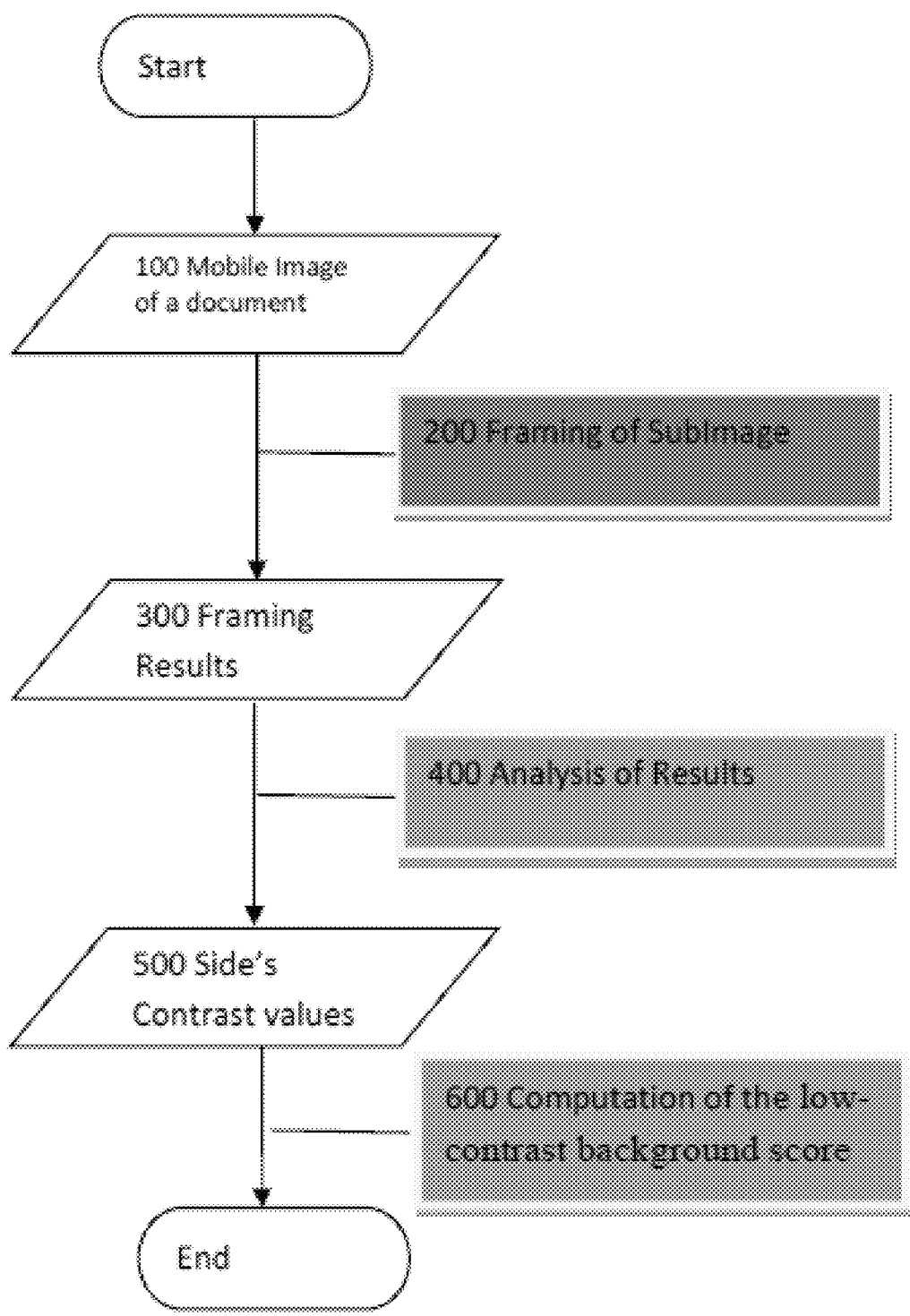
FIG. 28 is a flowchart illustrating a test for measuring the low contrast background, according to an embodiment.

The presence of a low contrast background is measured using found 4 geometrical lines (based on edges)—borders of the SubImage, as shown in FIG. 28. As shown in the flowchart in FIG. 26, in one embodiment, a mobile image of a document is submitted in step 100, and auto-framing of the document snippet occurs in step 200 to identify the SubImage. In step 300, the results of auto-framing, including all found edge-points and SubImage sides is output.

In step 400, an analysis of 300 is performed, as follows. For every SubImage side s ($1<=s<=4$) compute the contrast value:

Contrast[s]=average gradient value Grad(p) of all edge points p included into the side s, where Grad(p)=average(abs (G(p)−G(p'))), averaging over all pixels p' adjacent to p (there are 8 adjacent points) and G(p) is the gray level of pixel p ($0<=G(p)<=255$).

Normalized Contrast[s] is determined as follows:

Contrast[s]=min(100,Contrast[s])

In step 500, a Side-specific Contrast[s] values computed in 400 is output. In step 600, a final computation of the Low-contrast Background score is performed, as follows. Using side-specific Contrast[s] values 400, compute the total contrast as the sum over all sides:

Contrast=Contrast[1]+Contrast[2]+Contrast[3]+Contrast[4]

The Low-contrast Background score is calculated as:

Score=min(1000,2.5*Contrast)

As with the other tests described above, the acceptable value score may be adjusted depending on the type of application, device or use for the document, and the value may also be determined experimentally.

Those of skill in the art will appreciate that the various illustrative modules, components, engines, and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules, components, modules, engines, and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm and the functionality of a component, engine, or module described in connection with the embodiments disclosed herein can be embodied directly in hardware, in software executed by a processor, or in a combination of the two. Software can reside in computer or controller accessible computer-readable storage media including RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings

What is claimed is:

1. A method comprising using at least one hardware processor to:
   extract a document subimage from an image of a document captured by a camera of a mobile device;
   configure one or more of a plurality of image quality assurance (IQA) tests based on at least one feature of the mobile device, wherein the at least one feature comprises a capability of the camera of the mobile device;
   apply the plurality of IQA tests to the document subimage to assess a quality of the image; and
   approve or reject the image based on the assessment of the quality of the image.

2. The method of claim 1, wherein the at least one feature comprises a type of the mobile device.

3. The method of claim 1, wherein the at least one feature comprises a type of mobile application on the mobile device that will be used to process contents of the document.

4. The method of claim 1, wherein configuring the one or more IQA tests comprises selecting the plurality of IQA tests, from a datastore of available IQA tests, based on the at least one feature.

5. The method of claim 1, wherein configuring the one or more IQA tests comprises selecting parameters to be used by the one or more IQA tests based on the at least one feature.

6. A method comprising using at least one hardware processor to:
   extract a document subimage from an image of a document captured by a camera of a mobile device;
   configure one or more of a plurality of image quality assurance (IQA) tests based on at least one feature of the mobile device, wherein configuring the one or more IQA tests comprises selecting parameters to be used by the one or more IQA tests based on the at least one feature;
   apply the plurality of IQA tests to the document subimage to assess a quality of the image, wherein applying the plurality of IQA tests to the document subimage comprises adjusting the selected parameters in response to the document subimage failing at least one of the plurality of IQA tests a number of times; and
   approve or reject the image based on the assessment of the quality of the image.

7. The method of claim 5, wherein each of the one or more IQA tests, when applied to the document subimage, outputs a score, and wherein selecting parameters to be used by the one or more IQA tests comprises selecting a threshold to be compared to the score, output by each of the one or more IQA tests, to determine whether or not the document subimage passes that IQA test.

8. The method of claim 7, wherein selecting the threshold comprises selecting a lower threshold when the capability of the camera is lower and selecting a higher threshold when the capability of the camera is higher.

9. The method of claim 1, wherein applying the plurality of IQA tests to the document subimage comprises pre-processing the document subimage to produce at least one document snippet that is used by one or more of the plurality of IQA tests.

10. A method comprising using at least one hardware processor to:
    extract a document subimage from an image of a document captured by a camera of a mobile device;
    configure one or more of a plurality of image quality assurance (IQA) tests based on at least one feature of the mobile device;
    apply the plurality of IQA tests to the document subimage to assess a quality of the image, wherein applying the plurality of IQA tests to the document subimage comprises pre-processing the document subimage to produce a plurality of document snippets that are used by one or more of the plurality of IQA tests, wherein each of the plurality of document snippets is a result of different pre-processing, and wherein at least one of the plurality of IQA tests uses a different one of the plurality of document snippets than another one of the plurality of IQA tests; and
    approve or reject the image based on the assessment of the quality of the image.

11. The method of claim 9, wherein the pre-processing comprises converting the document subimage into a grayscale or bitonal image.

12. The method of claim 1, wherein the plurality of IQA tests comprises one or more critical tests, and wherein approving or rejecting the image comprises rejecting the image if the document subimage fails any of the one or more critical tests.

13. The method of claim 12, wherein the document is a check, and wherein the one or more critical tests comprise a magnetic ink character recognition (MICR) line test that assesses a quality of a MICR line in the document subimage.

14. The method of claim 12, wherein the plurality of IQA tests comprises one or more non-critical tests, and wherein the method comprises using the at least one hardware processor to flag the image for review by a user if the document subimage fails any of the one or more critical tests.

15. The method of claim 1, wherein the at least one hardware processor is comprised in the mobile device.

16. The method of claim 15, further comprising using the at least one hardware processor to, when the image is rejected, display a message indicating a reason for the rejection on a display of the mobile device.

17. The method of claim 1, wherein the plurality of IQA tests comprises a Check 21 test.

18. A system comprising:
    at least one hardware processor; and
    software that is configured to, when executed by the at least one hardware processor,
        extract a document subimage from an image of a document captured by a camera of a mobile device,
        configure one or more of a plurality of image quality assurance (IQA) tests based on at least one feature of the mobile device, wherein the at least one feature comprises a capability of the camera of the mobile device,
        apply the plurality of IQA tests to the document subimage to assess a quality of the image, and
        approve or reject the image based on the assessment of the quality of the image.

19. A non-transitory computer-readable medium having instructions stored therein, wherein the instructions, when executed by a processor, cause the processor to:
    extract a document subimage from an image of a document captured by a camera of a mobile device;

configure one or more of a plurality of image quality assurance (IQA) tests based on at least one feature of the mobile device, wherein the at least one feature comprises a capability of the camera of the mobile device;

apply the plurality of IQA tests to the document subimage to assess a quality of the image; and approve or reject the image based on the assessment of the quality of the image.

* * * * *